United States Patent
Ootani et al.

(10) Patent No.: US 9,590,283 B2
(45) Date of Patent: Mar. 7, 2017

(54) TAPE-SHAPED ELECTRODE, METAL-AIR BATTERY EMPLOYING SAME, AND USED TAPE-SHAPED ELECTRODE REDUCING DEVICE

(71) Applicant: Sharp Kabushiki Kaisha, Osaka (JP)

(72) Inventors: Takuya Ootani, Osaka (JP); Naoto Nishimura, Osaka (JP); Akihito Yoshida, Osaka (JP); Hirotaka Mizuhata, Osaka (JP); Shougo Esaki, Osaka (JP); Shumpei Nishinaka, Osaka (JP); Satoshi Arima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 256 days.

(21) Appl. No.: 14/411,765

(22) PCT Filed: Jul. 4, 2013

(86) PCT No.: PCT/JP2013/068332
§ 371 (c)(1),
(2) Date: Dec. 29, 2014

(87) PCT Pub. No.: WO2014/007312
PCT Pub. Date: Jan. 9, 2014

(65) Prior Publication Data
US 2015/0162653 A1 Jun. 11, 2015

(30) Foreign Application Priority Data
Jul. 4, 2012 (JP) .................................. 2012-150684

(51) Int. Cl.
*H01M 12/06* (2006.01)
*H01M 4/12* (2006.01)
(Continued)

(52) U.S. Cl.
CPC .......... *H01M 12/065* (2013.01); *H01M 4/06* (2013.01); *H01M 4/12* (2013.01); *H01M 4/38* (2013.01);
(Continued)

(58) Field of Classification Search
CPC ............... H01M 12/06; H01M 12/065; H01M 2004/021; H01M 4/06; H01M 4/12; H01M 4/38
See application file for complete search history.

(56) References Cited

U.S. PATENT DOCUMENTS 3,577,281 A * 5/1971 Pountney ............... H01M 8/184
429/127
4,916,036 A * 4/1990 Cheiky .................. H01M 4/12
429/127
(Continued)

FOREIGN PATENT DOCUMENTS

JP 07-045270 2/1995
JP 2003-521795 7/2003
(Continued)

OTHER PUBLICATIONS

International Search Report for corresponding International Application No. PCT/JP2013/068332 mailed Sep. 3, 2013.

*Primary Examiner* — Carlos Barcena
(74) *Attorney, Agent, or Firm* — Renner, Otto, Boisselle & Sklar, LLP

(57) ABSTRACT

Provided is a tape-shaped electrode that can effectively perform discharging and recharging even if the size thereof is increased. The tape-shaped electrode includes a plurality of conductive plates, and insulating coupling members that separably couple the plurality of conductive plates arranged in one direction in an insulating state.

2 Claims, 17 Drawing Sheets

(51) Int. Cl.
H01M 4/38 (2006.01)
H01M 4/06 (2006.01)
H01M 4/02 (2006.01)

(52) U.S. Cl.
CPC ...... *H01M 12/06* (2013.01); *H01M 2004/021* (2013.01)

(56) References Cited

U.S. PATENT DOCUMENTS

| | | | | |
|---|---|---|---|---|
| 6,287,715 | B1 * | 9/2001 | Faris | H01M 6/5011 429/127 |
| 6,332,899 | B1 * | 12/2001 | Pong | H01M 4/04 29/623.1 |
| 2001/0023036 | A1 * | 9/2001 | Faris | B60L 11/1883 429/404 |
| 2005/0100781 | A1 | 5/2005 | Jang et al. | |

FOREIGN PATENT DOCUMENTS

| | | |
|---|---|---|
| KR | 101172608 B1 * | 8/2012 |
| WO | WO 99/18628 A1 | 4/1999 |

* cited by examiner

FIG. 3
(A)
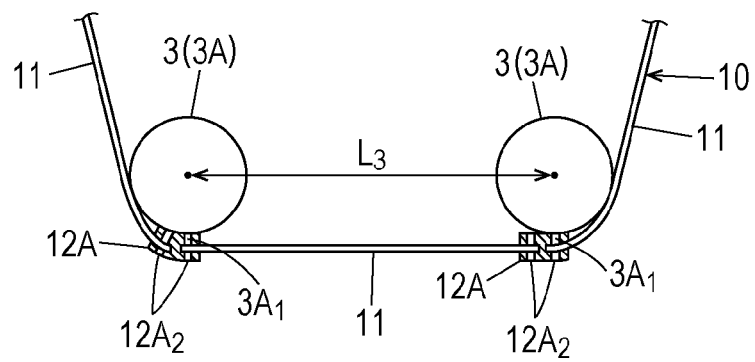
(B)
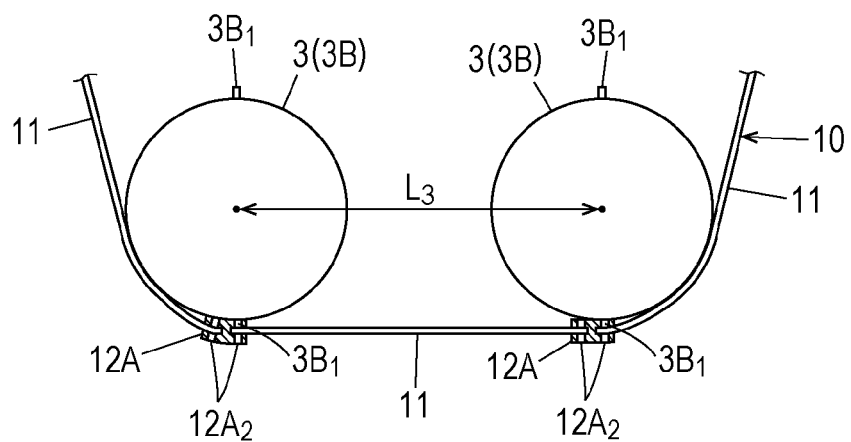
FIG. 4
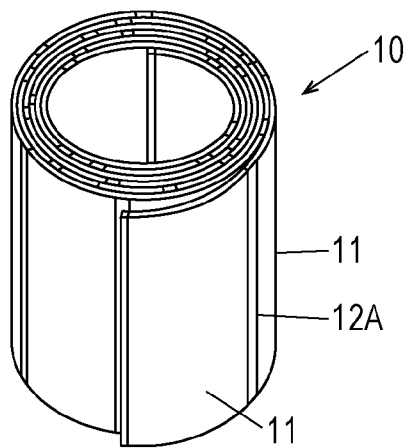

TAPE-SHAPED ELECTRODE, METAL-AIR BATTERY EMPLOYING SAME, AND USED TAPE-SHAPED ELECTRODE REDUCING DEVICE

TECHNICAL FIELD

The present invention relates to a tape-shaped electrode, a metal-air battery employing the same, and a used tape-shaped electrode reducing device.

BACKGROUND ART

Since a metal-air battery of which an anode is a metallic electrode and a cathode is an air electrode has a high energy density, the metal-air battery is receiving attention as a next generation battery.

As a representative metal-air battery, there is a zinc air battery. FIG. 20 is a cross-sectional view schematically illustrating a discharge reaction of the zinc air battery. As illustrated in FIG. 20, the zinc air battery has a zinc electrode 101 provided in the alkaline electrolyte solution 103 and an air electrode 105 provided on an anion exchanging membrane 106 which comes into contact with an electrolyte solution 103, and electric power is output from the zinc electrode 101 and the air electrode 105 as the discharge reaction progresses. In addition, the air electrode 105 is generally a carbon carrier supporting a catalyst of an air electrode.

In the discharge reaction of the zinc air battery, zinc metal of the zinc electrode 101 reacts with hydroxide ions in the alkaline electrolyte solution 103 to form the zinc hydroxide, and electrons are discharged to the zinc electrode 101. In addition, the zinc hydroxide is decomposed and the zinc oxide is deposited in the electrolyte solution. In addition, in the air electrode 105, electrons, water, and oxygen react to generate hydroxide ions, and the hydroxide ions cause the anion exchanging membrane 106 to be conductive, and move to the alkaline electrolyte solution 103. If the discharge reaction progresses as described above, the zinc metal of the zinc electrode 101 is consumed and zinc oxide is accumulated in the alkaline electrolyte solution 103. Accordingly, in order to maintain the output of the electricity in the zinc air battery, the zinc metal has to be supplied to zinc metal electrode 101, and the zinc oxide deposited in the alkaline electrolyte solution 103 has to be removed.

Therefore, a method of supplying metal to a metal-air battery is suggested (for example, see PTLs 1 and 2).

The metal-air battery of PTL 1 is configured to have a card-shape in which an anode structure having a zinc electrode is exchangeable.

In addition, a metal-air fuel battery system of PTL 2 includes a metal fuel tape on an anode side and a discharging head on a cathode side to which the metal fuel tape is delivered. In the metal fuel tape, zinc which is metal is stacked on an insulation base layer. The discharging head includes a gel-type electrolyte that comes into contact with the metal of the metal fuel tape, a cathode plate that comes into contact with the gel-type electrolyte and an air introduction section provided on a cathode plate side.

In a metal-air fuel battery system of PTL 2, if a metal fuel tape has a plurality of fuel tracks, a discharging head is configured as a multiple track discharging head. According to the air fuel battery system, if the metal (Zn) of the discharged metal fuel tape is consumed, the metal fuel tape moves so that unused metal is delivered to the discharging head. In addition, according to the metal fuel battery system, recharging by using the metal fuel tape used in the discharging may be performed.

CITATION LIST

Patent Literature

PTL 1: Japanese Unexamined Patent Application Publication No. 7-45270

PTL 2: Japanese Unexamined Patent Application Publication (Translation of PCT Application) No. 2003-521795

SUMMARY OF INVENTION

Technical Problem

Since the metal-air battery of PTL 1 has a method in which a zinc electrode consumed in the discharging is exchanged with a new zinc electrode (card exchanging method), if the size of the metal-air battery is increased, the number of zinc electrodes increases causing labor costs to become high in manual exchange work, or causing equipment costs to become high in automatic exchange work. Therefore, the cost increases in any case.

In the air fuel cell system of PTL 2, an electric voltage is applied to the metal fuel tape at the time of discharging, but an electric voltage is applied not only to a portion that comes into contact with the discharging head, but also to the entire metal fuel tape. Therefore, it is considered that the discharging efficiency is low. Also, the recharging has the same effect for the same reason. Further, if the size of the air fuel battery system is increased, the density unevenness occurs in the gel-type electrolyte provided in the discharging head so it is expected that even discharging and recharging may be difficult.

The invention is provided in view of the circumstances, and an aspect of the invention is to provide a tape-shaped electrode that can effectively perform discharging and recharging even if the size thereof is increased.

Solution to Problem

According to the invention, there is provided a tape-shaped electrode including a plurality of conductive plates, and insulating coupling members that couple the plurality of conductive plates arranged in one direction in an insulating state.

Advantageous Effects of Invention

If the tape-shaped electrode of the invention is used as an anode of the metal-air battery, one sheet of the conductive plate is set to be one section, and the discharging may be performed one section by one section. Therefore, the discharging may be evenly performed effectively, and also the management of the electrode state becomes easy so as to be applied to the large metal-air battery. The recharging has the same effect for the same reason.

In addition, since the tape-shaped electrode of the invention is discharged and recharged in a roller-to-roller method, the discharging and the recharging are continuously performed effectively without exchanging the conductive plate, and also the increase of the labor or equipment costs accompanying the exchange of the conductive plate is not caused.

In addition, in the tape-shaped electrode of the invention, if the conductive plate is removed from the insulating coupling member, the conductive plate may be used in discharging in the card exchanging method, so the tape-shaped electrode of the invention may be applied to a small metal-air battery.

Further, since the tape-shaped electrode may be caused to be compact in a rolled state or a zigzag folded state, the volume may be reduced, so that the tape-shaped electrode may be effectively kept and delivered.

BRIEF DESCRIPTION OF DRAWINGS

FIG. 3(A) is a diagram illustrating a state in which the tape-shaped electrode stretches to a pair of electrode rollers in the metal-air battery of FIG. 1. FIG. 3(B) is a diagram illustrating a state in which the tape-shaped electrode stretches to another pair of electrode rollers in the metal-air battery of FIG. 1.

FIG. 4 is a perspective view illustrating a state in which a tape-shaped electrode employed in the metal-air battery of FIG. 1 is wound in a roll shape.

DESCRIPTION OF EMBODIMENTS

Figure 1:
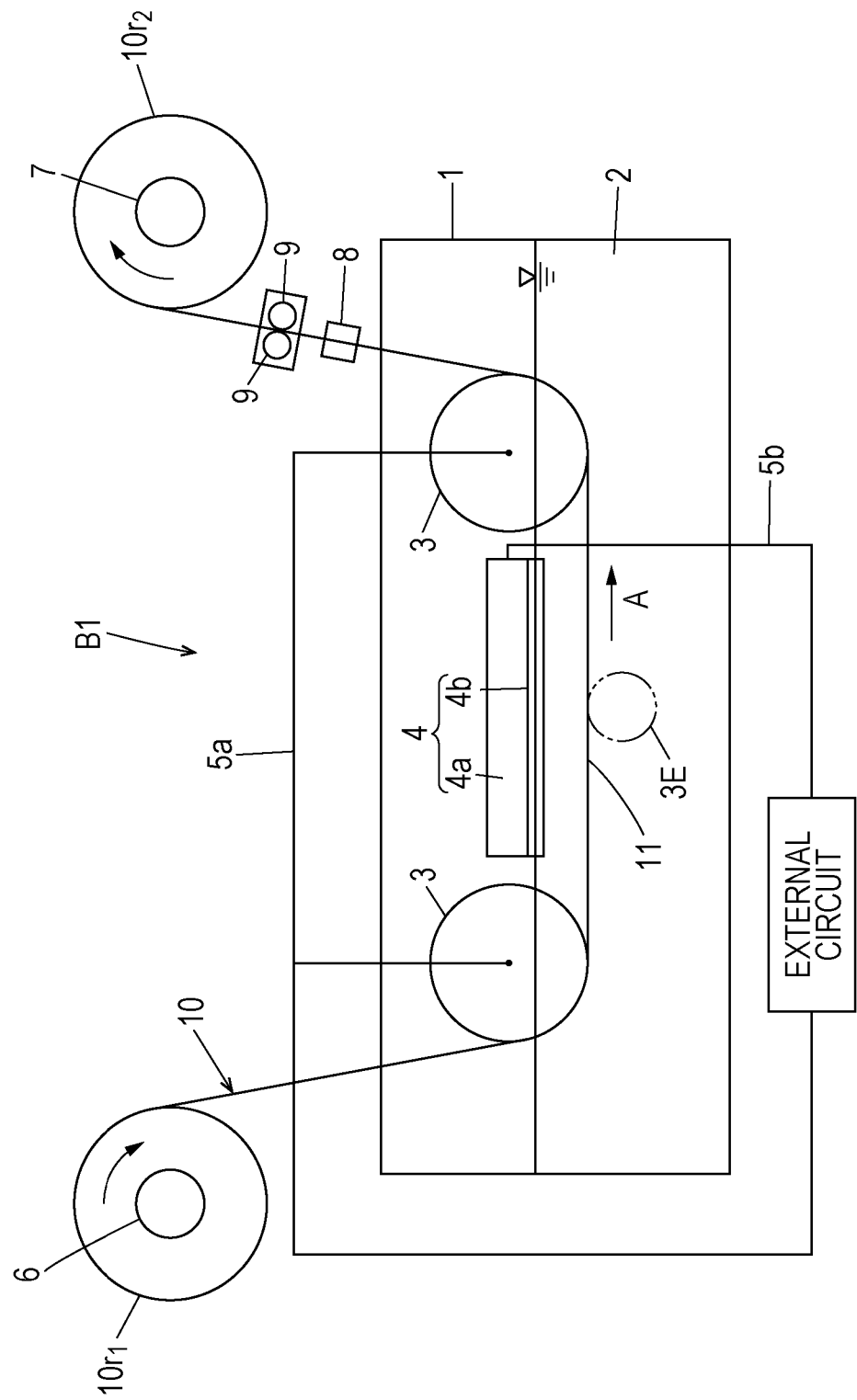
FIG. 1 is a diagram illustrating a configuration of a metal-air battery including a tape-shaped electrode of the invention (Embodiment 1-1).

The tape-shaped electrode according to the invention includes a plurality of conductive plates, and insulating coupling members that couple the plurality of conductive plates arranged in one direction in an insulating state.

In the tape-shaped electrode of the invention, the conductive plates may include substrates formed of a first conductive material; and electrodeposited layers formed of a second conductive material which entirely cover at least one surfaces of the substrates. According to the configuration, the tape-shaped electrode becomes the tape-shaped electrode appropriate for the metal-air battery. In this case, the first conductive material may be selected depending on kinds of electrolyte solution, and the second conductive material may be selected depending on kinds of metal-air battery. In addition, these are specifically described later.

The tape-shaped electrode of the invention may be configured as in the following (1) to (3).

(1) Shapes of the conductive plates may be rectangular, and the insulating coupling members maybe configured to couple facing edge sides of two adjacent conductive plates to each other.

According to the configuration, a plurality of the conductive plates may be easily coupled by insulating coupling members having a simplified structure at a certain interval in an insulating manner.

In the case of the (1), more specifically, the insulating coupling members may be formed of insulating resin molded products that couple two adjacent conductive plates by holding the facing edge sides.

Otherwise, the two adjacent conductive plates may have through holes on the facing edge sides thereof, and the insulating coupling members may be formed of insulating resin strings that couple two adjacent conductive plates by being inserted into the through holes of the facing edge sides and tied in a circular shape.

Otherwise, two adjacent conductive plates may have folded portions formed by folding the facing edge sides of the conductive plates in a cylindrical shape, and the insulating coupling members maybe formed of insulating resin strings that couple two adjacent conductive plates by being inserted into the folded portions of the facing edge sides and tied in a circular shape.

(2) The insulating coupling members are formed of insulating resin tapes having pasting surface portions to which the plurality of conductive plates may be attached in line in one direction.

According to the configuration, the same effect as in the (1) maybe obtained. Further, since one bend-shaped long sheet of the tape-shaped insulating coupling member may be used, a plurality of conductive plates may be effectively coupled by the bonding of the conductive plates to the tape-shaped insulating coupling member.

(3) Shapes of the conductive plates may be rectangular, and the insulating coupling members may be formed of a pair of insulating resin molded products that couple the plurality of conductive plates by holding the edge sides extending in one direction of the plurality of conductive plates arranged in one direction.

According to the configuration, the same effect as in the (1) may be obtained. Further, since a pair of long insulating coupling members formed of the molded products may be used, a plurality of conductive plates may be effectively connected by the bonding of the conductive plates to the insulating coupling members.

In addition, details are described below, but the metal-air battery including the tape-shaped electrode configured as described in this manner, and the used tape-shaped electrode reducing device employed in the metal-air battery are also included in the scope of the invention.

Hereinafter, with reference to the drawings, the tape-shaped electrode of the invention, the metal-air battery employing the same, and the used tape-shaped electrode reducing device are specifically described. In addition, in the drawings describing the respective embodiments, the same components are denoted by the same reference numerals, and the descriptions of the same components are not repeated.

(Embodiment 1-1)

FIG. 1 is a diagram illustrating a configuration of a metal-air battery including a tape-shaped electrode of the invention (Embodiment 1-1).

A metal-air battery B1 is a roller to roller-type metal-air battery, and includes an electrolyte solution tank 1 that accommodates an electrolyte solution 2, a pair of electrode rollers 3 that is provided so as to be rotatable about a horizontal axis in the electrolyte solution 2 in the electrolyte solution tank 1, a tape-shaped electrode 10 that comes into electrical contact with the pair of electrode rollers 3 and stretches to the electrolyte solution 2 by the pair of electrode rollers 3, and an air electrode 4 that is disposed in the electrolyte solution tank 1 so as to face the tape-shaped electrode 10. The electrode rollers 3 and the air electrode 4 are configured to be electrically connected to conductive portions 5a and 5b that produce electric power.

In addition, the metal-air battery B1 includes a holding shaft 6 that rotatably holds a feeding roller $10r_1$ of the tape-shaped electrode 10, a driving shaft 7 that rotates and holds a winding roller $10r_2$ of the tape-shaped electrode 10, and an air jetting portion 8 and a pair of pressing rollers 9 provided between the winding roller $10r_2$ and the electrode roller 3 on the downstream side in a tape movement direction (direction of arrow A). In addition, though not illustrated in the drawings, a cap that covers an upper opening portion of the electrolyte solution tank 1 in an openable manner so as not to interfere with the movement of the tape-shaped electrode 10 is provided in the electrolyte solution tank 1.

The electrolyte solution tank 1 and the pair of electrode rollers 3 may be configured with the same material as a material (first conductive material) of substrates 11a that configure conductive plates 11 of the tape-shaped electrode 10 described below.

With respect to the pair of electrode rollers 3, rotation shafts thereof rotatably pivot on the side wall of the electrolyte solution tank 1. In addition, one end of each of the rotation shafts of the electrode rollers 3 penetrates the sidewall of the electrolyte solution tank 1 in a liquid tight manner, is coupled to a motor (not illustrated), and simultaneously rotates. At this point, the driving shaft 7 of the winding roller $10r_2$ simultaneously rotates.

An electrolyte solution 3 is liquid obtained by dissolving electrolytes in a solvent to have ion conductivity. Types of the electrolyte solution 3 are different according to types of metal that configure the conductive plates 11 of the tape-shaped electrode 10 described below. However, the electrolyte solution 3 maybe an electrolyte solution using the aqueous solvent (electrolyte aqueous solution), or may be an electrolyte solution using organic solvent (organic electrolyte solution). For example, in the case of a zinc air battery, an aluminum air battery, and an iron air battery, an alkali aqueous solution such as a sodium hydroxide aqueous solution or a potassium hydroxide aqueous solution maybe used as the electrolyte solution. In the case of a magnesium air battery, a sodium chloride aqueous solution may be used as the electrolyte solution. In addition, in the case of a lithium metal battery, a sodium air battery, and a calcium air battery, the organic electrolyte solution may be used.

For example, the air electrode 4 includes a current collector portion 4a that supports catalyst of an air electrode in a carbon carrier, and an anion exchanging membrane 4b that is provided on the lower surface of the current collector portion 4a and comes into contact with the electrolyte solution 2. For example, the air electrode 4 is fixed to the sidewall of the electrolyte solution tank 1 at a height position in which the anion exchanging membrane 4b is immersed in the electrolyte solution 2 under the liquid surface, and is hung from the upper opening portion of the electrolyte solution tank 1 by a support member.

The air jetting portion 8 blows off the electrolyte solution attached to the tape-shaped electrode 10 pulled out from the electrolyte solution 2 with air.

The pair of pressing rollers 9 presses the tape-shaped electrode 10, removes deposits on a surface of a conductive plate described below, and flattens the tape-shaped electrode 10.

FIG. 2(A) is a side cross-sectional view illustrating a portion of the tape-shaped electrode employed in the metal-air battery of FIG. 1, and FIG. 2(B) is a plan view illustrating the tape-shaped electrode of FIG. 2(A).

The tape-shaped electrode 10 according to the invention includes the plurality of rectangular conductive plates 11, and insulating coupling members 12A that couple the plurality of the conductive plate 11 in one direction in an insulated state.

The conductive plates 11 include the rectangular substrates 11a formed of a first conductive material, and electrodeposited layers 11b formed of a second conductive material that entirely cover at least one surface of the substrates 11a. In the case of Embodiment 1-1, a case in which the surface of the substrate 11a is entirely covered with the electrodeposited layer 11b is provided as an example.

Sizes and thicknesses of the substrates 11a are not particularly limited, but, for example, the sizes may be from 50 mm to 1,000 mm×100 to 2,000 mm, and the thicknesses may be from 0.05 mm to 0.5 mm.

For example, as the first conductive material that configures the substrates 11a, metal having corrosion resistance to the electrolyte solution 2 may be used. Accordingly, it is possible to collect currents from the electrodeposited layers 11b via the substrates 11a, and it is possible to connect the electrodeposited layers 11b and an external circuit. Also, the electrode rollers 3 may be configured with the first conductive material.

The first conductive material when the electrolyte solution 2 is alkaline maybe selected from metal including Ni, stainless steel, and a lead alloy, noble metal including Au, Pt, and Pd, and carbon materials such as acetylene black, Ketjen black, furnace black, VGCF, carbon nanotube, carbon nanohorn, and fullerene.

The first conductive material when the electrolyte solution 2 is acidic may be selected from noble metal including Au, Pt, and Pd, an alloy including Ti, Ta, W, Nb, Ni, Al, Cr, Ag, Cu, and Zn, and nitride and carbide of the metal, metal including stainless steel, Cu—Cr, Ni—Cr, and Ti—Pt, and carbon materials including acetylene black, Ketjen black, furnace black, VGCF, carbon nanotube, carbon nanohorn, and fullerene.

The first conductive material when the electrolyte solution 2 is the organic electrolyte solution maybe selected from carbon materials including Ni, Al, Cu, stainless steel, Ti, acetylene black, Ketjen black, furnace black, VGCF, carbon nanotube, carbon nanohorn, and fullerene.

The electrodeposited layers $11b$ discharge electrons by a discharge reaction of the battery, and are formed of a second conductive material that chemically changes by the deposits of the metal compound (fine particles, needle-shaped particles, plate-shaped particles, and the like). Thicknesses thereof are not particularly limited, and are, for example, from 5 μm to 500 μm.

The second conductive material may be selected from Mg, Li, Na, Ca, Zn, Cu, Cd, Ni, Co, Mn, and Cr. For example, the zinc air battery is formed of zinc, the aluminum air battery is formed of aluminum, the iron air battery is formed of iron, the magnesium air cell is formed of magnesium, the lithium metal battery is formed of lithium, the sodium air battery is formed of sodium, and the calcium air battery is formed of calcium.

In addition, the second conductive material that configures the electrodeposited layers $11b$ is not limited to these examples, as long as it can form the metal-air battery. In addition, the electrodeposited layers $11b$ are formed of a kind of metallic element in the example, but may be formed of an alloy.

The fixation of the electrodeposited layers $11b$ to the main surface of the substrates $11a$ maybe performed by pressing particles or lumps of the second conductive material to the surfaces of the substrates $11a$, or by depositing the second conductive material on the substrates $11a$ by plating.

The chemical change from the second conductive material that configures the electrodeposited layers $11b$ by the process of the discharge reaction of the battery to the deposits of the metal compound may occur in the electrodeposited layers $11b$, or may occur in both of the electrodeposited layers $11b$ and the electrolyte solution 2. For example, in the electrodeposited layers $11b$, the second conductive material reacts with the ions included in the electrolyte solution 2, the ions including the second conductive material are generated in the electrolyte solution 2, the ions including the second conductive material are decomposed, and thus the deposits of the second conductive material compound may be generated. In addition, in the electrodeposited layers $11b$, the second conductive material may react with the ions included in the electrolyte solution 2 to generate the deposits of the second conductive material compound. In addition, in the electrodeposited layers $11b$, the second conductive material may be dissolved in the electrolyte solution 2 as metallic ions, the ions of the second conductive material may react in the electrolyte solution 2, and thus the deposits of the second conductive material compound may be generated.

In addition, when two or more types of electrolyte solutions are used, in the electrodeposited layers $11b$, the second conductive material may be dissolved in the first electrolyte solution as the metallic ions, the ions of the second conductive material may move to the second electrolyte solution, and thus the second conductive material compound may be generated. In addition, two or more types of electrolyte solutions may be divided by solid electrolytes.

The insulating coupling members 12A are configured so as to couple facing edge sides (short sides) of the two adjacent conductive plates 11 with each other.

Figure 2:
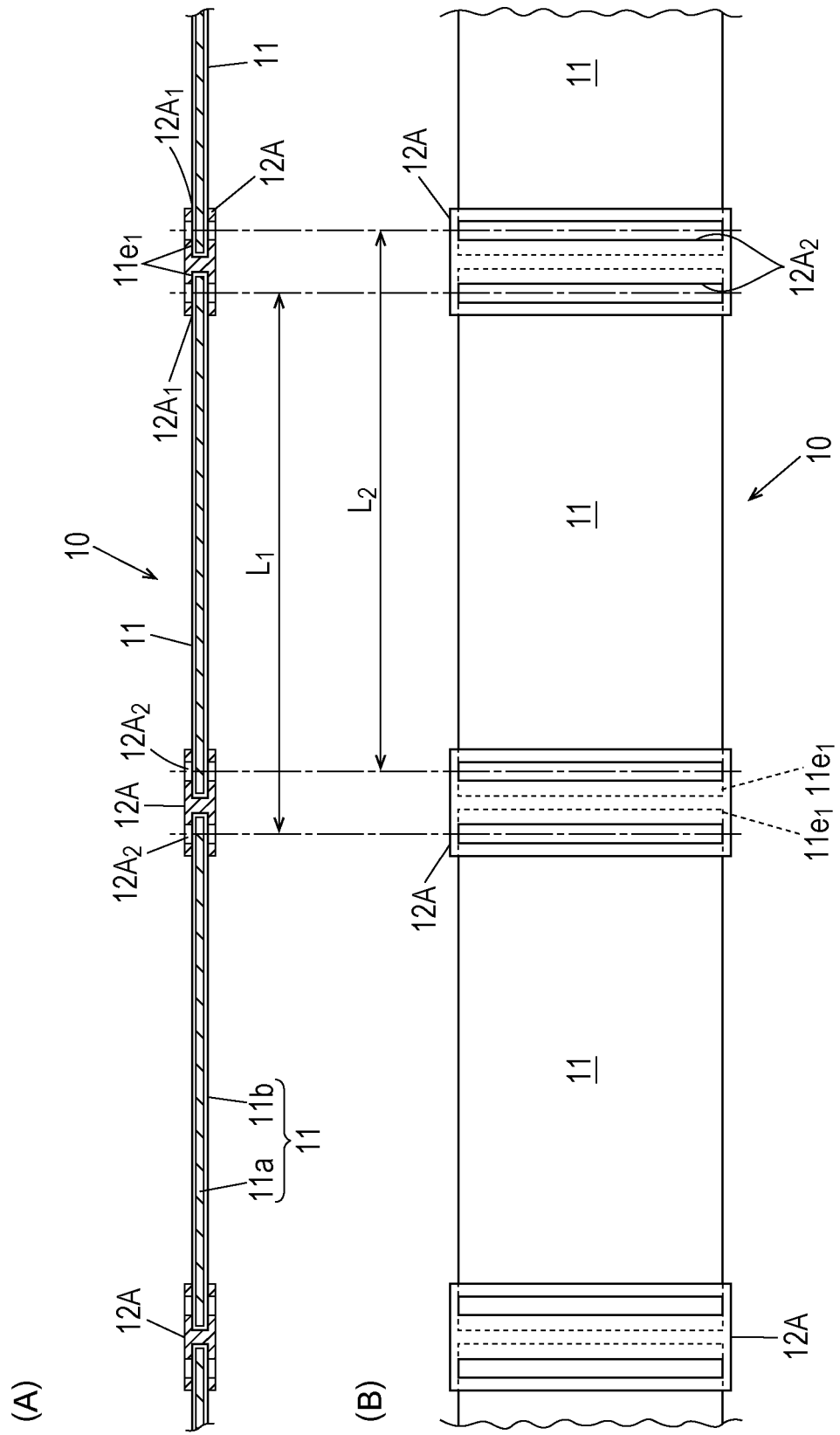
FIG. 2(A) is a side cross-sectional view illustrating a portion of the tape-shaped electrode employed in the metal-air battery of FIG. 1.
FIG. 2(B) is a plan view illustrating the tape-shaped electrode of FIG. 2(A).

The insulating coupling members 12A illustrated in FIG. 2 are formed of an insulating resin molded product that couples two adjacent conductive plates 11 by holding the facing edge sides $11e_1$ and $11e_1$.

The insulating coupling member 12A presents a rectangular plate-shaped exterior, has insertion openings $12A_1$ in which two edge sides $11e_1$ and $11e_1$ of the conductive plates 11 are press-fit into a pair of long side portions, and has four long and narrow openings $12A_2$ that expose both surfaces of the edge sides $11e_1$ and $11e_1$ that communicate with the pair of insertion openings $12A_1$.

The insulating coupling member 12A is formed of a resin having corrosion resistance and insulation to the electrolyte solution 2.

Examples of an alkali-resistant resin include polyvinyl chloride (PVC), acrylonitrile-butadiene-styrene (ABS), polyethylene (PE), polypropylene (PP), polyamide (PA), and epoxy (EP). Also, examples of acid-resistant resin include PVC, ABS, PE, PP, polytetrafluoroethylene (PTFE), and EP. In addition, examples of an organic electrolyte solution-resistant resin include PP.

FIG. 3(A) is a diagram illustrating a state in which the tape-shaped electrode stretches to the pair of electrode rollers in the metal-air battery of FIG. 1, and FIG. 3(B) is a diagram illustrating a state in which the tape-shaped electrode stretches to another pair of electrode rollers in the metal-air battery of FIG. 1.

As illustrated in FIGS. 1, 2, 3(A), and 3(B), in the tape-shaped electrode 10 obtained by coupling the plurality of conductive plates 11 to the plurality of insulating coupling members 12A in series, an interval $L_1$ between the left opening $12A_2$ of one insulating coupling member 12A and the left opening $12A_2$ of another adjacent insulating coupling member 12A is identical to an interval $L_2$ between the right opening $12A_2$ of one insulating coupling member 12A and the right opening $12A_2$ of another adjacent insulating coupling member 12A, and the intervals $L_1$ and $L_2$ are identical to an interval $L_3$ between the pair of electrode rollers 3 in the electrolyte solution tank 1. That is, if a diameter of the electrode roller 3 is D, a relationship "interval $L_1$=interval $L_2$=Dπ" is satisfied.

When the metal-air battery B1 is used, the feeding roller $10r_1$ of the tape-shaped electrode 10 is set to the holding shaft 6 so that a start edge of the tape-shaped electrode 10 is pulled out from the feeding roller $10r_1$, passes through lower portions of the pair of electrode rollers 3 in the electrolyte solution tank 1, and is fixed to the driving shaft 7. In addition, since a start edge side portion and an end edge side portion of the tape-shaped electrode 10 are not immersed in the electrolyte solution 2 in the electrolyte solution tank 1, a resin tape having corrosion resistance may be used instead of the conductive plates 11 coupled via the insulating coupling members 12A.

Figure 20:
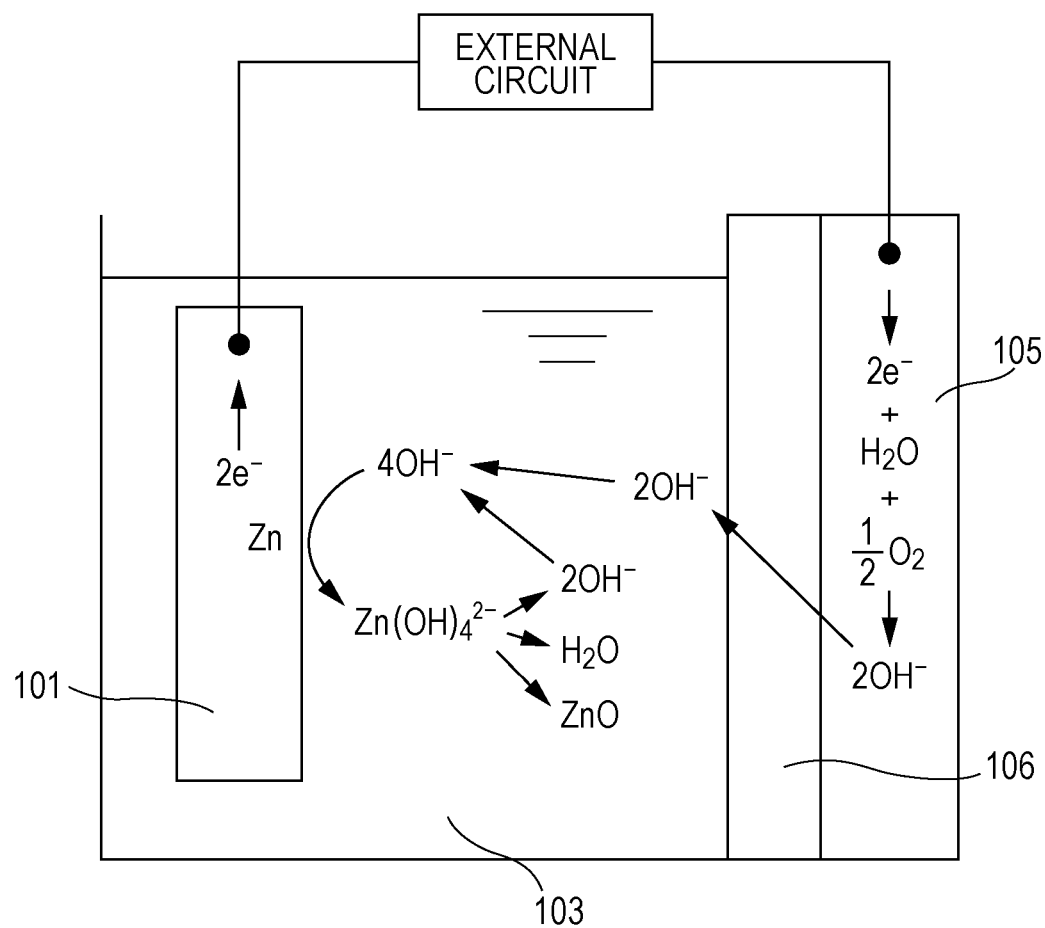
FIG. 20 is a cross-sectional view schematically illustrating a discharge reaction of a zinc air cell according to a related art.

As illustrated in FIG. 3(A), the pairs of electrode rollers 3A each have one conductive convex portion $3A_1$ which extends to an outer peripheral surface thereof in the rotation axis direction. Therefore, the convex portions $3A_1$ of the pair of electrode rollers 3A are fit into the left or right openings $12A_2$ of the pair of insulating coupling members 12A on both ends of the conductive plates 11 in the movement direction. Accordingly, one electrode roller 3A comes into electrical contact with one edge side $11e_1$ of the conductive plate 11 that faces the air electrode 4 via the convex portion $3A_1$ in a portion between the pair of electrode rollers. Accordingly, a discharge reaction (see FIG. 20) occurs between the air electrode 4 and the conductive plates 11 that face each other by applying a predetermined voltage to one electrode roller 3A and the air electrode 4, so that electric power is supplied to the external circuit. Meanwhile, an oxide of the second conductive material that configures the electrodeposited layer 11b of the conductive plate 11 in the electrolyte solution 2 is generated by the discharge reaction. For example, if the second conductive material is Zn, ZnO is generated in the electrolyte solution 2.

The electrode roller 3B illustrated in FIG. 3(B) has a diameter of double the diameter of the electrode roller 3A of FIG. 3(A), and two conductive convex portions $3B_1$ that extend in the rotation axis direction are provided on the outer peripheral surface at a position of a center angle of 180°. In this case, the convex portions $3B_1$ of the pair of electrode rollers 3B are also fit into the left or right openings $12A_2$ of the pair of insulating coupling members 12A on both sides of the conductive plates 11 in the movement direction. Accordingly, one electrode roller 3B comes into electrical contact with one edge side $11e_1$ of the conductive plate 11 that faces the air electrode 4 via the convex portion $3B_1$ in a portion between the pair of electrode rollers. In this state, the discharge reaction does not occur between the air electrode 4 and the conductive plates 11 that face each other, and electric power is supplied to the external circuit. At this point, a discharge reaction occurs on the surface of the conductive plate 11 opposite to the air electrode 4.

In the case of FIG. 3(A), the conductive plate 11 moves by one sheet by rotating the electrode roller 3A once so that the next conductive plate 11 is set at a discharge position. Meanwhile, in the case of FIG. 3(B), the conductive plate 11 moves by one sheet by half-rotating the electrode roller 3B so that the next conductive plate 11 is set at a discharge position. At this point, the second conductive material (for example, Zn) on the surface of the conductive plate 11 is consumed by the discharge, and when the supply power decreases to a certain level, a subsequent new conductive plate 11 which is not used in the discharge is set in the discharge position. In addition, in the case of FIGS. 3(A) and 3(B), the conductive plates 11 positioned on both sides of the conductive plate 11 at the discharge position which faces the air electrode 4 come into electrical contact with the pair of electrode rollers 3A or 3B. However, since these conductive plates 11 do not face the air electrode 4, the conductive plates 11 do not contribute to the discharge.

Accordingly, after the discharge is performed by using one surface of each of all conductive plates 11, the tape-shaped electrode 10 may be set again to perform discharge by using the other surfaces of the respective conductive plates 11.

In addition to providing the convex portions $3A_1$ and $3B_1$ to the electrode rollers 3A and 3B to obtain electrical contact with the conductive plate 11 that faces the air electrode 4, as illustrated in FIG. 1 with a two-dot chain line, a roller-shaped contact electrode 3E is provided between the pair of electrode rollers 3 to cause the contact electrode 3E to come into electrical contact with the surface opposite to the air electrode 4 of the conductive plate 11. In this case, the conductive portion 5a is electrically connected to the contact electrode 3E instead of the electrode rollers 3. Also, it is not necessary to form the openings $12A_2$ in the insulating coupling members 12A.

FIG. 4 is a perspective view illustrating a state in which a tape-shaped electrode employed in the metal-air battery of FIG. 1 is wound in a roll shape.

In the tape-shaped electrode 10 having the configuration as described above, since the conductive plates 11 and the insulating coupling members 12A have a certain degree of flexibility, it is possible to make the metal-air battery compact by winding it in a roll shape, and the metal-air battery may be effectively kept and moved.

<Modification Example 1 of Embodiment 1-1>

Figure 5:
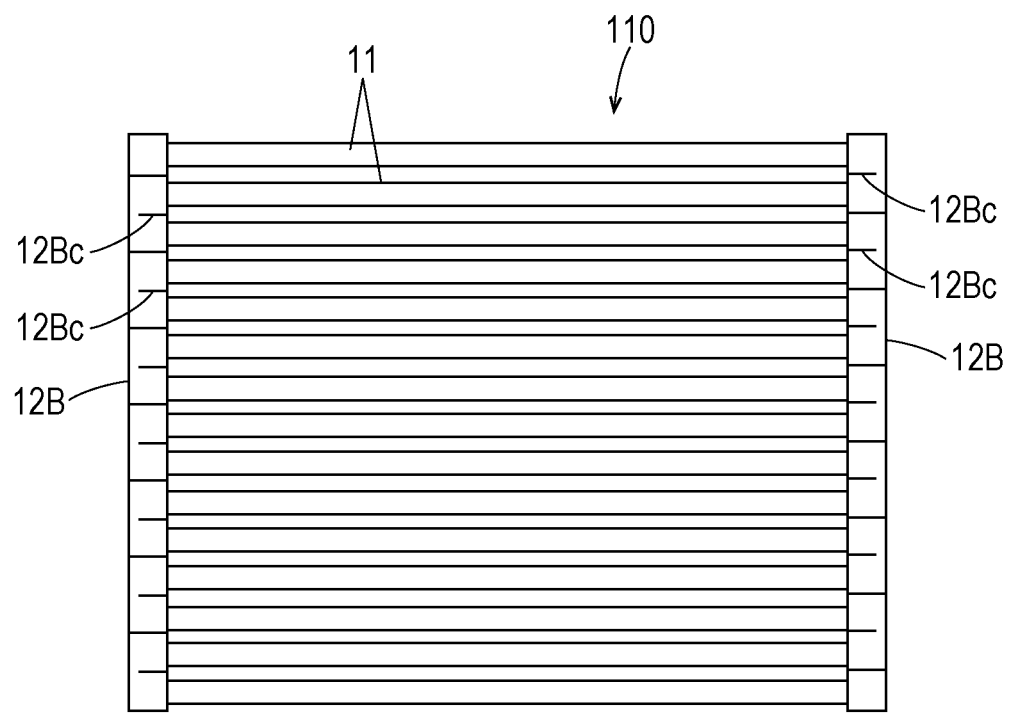
FIG. 5 is a front view illustrating a tape-shaped electrode of Modification Example 1 in a state of being folded in a zigzag shape according to the invention.
Figure 6:
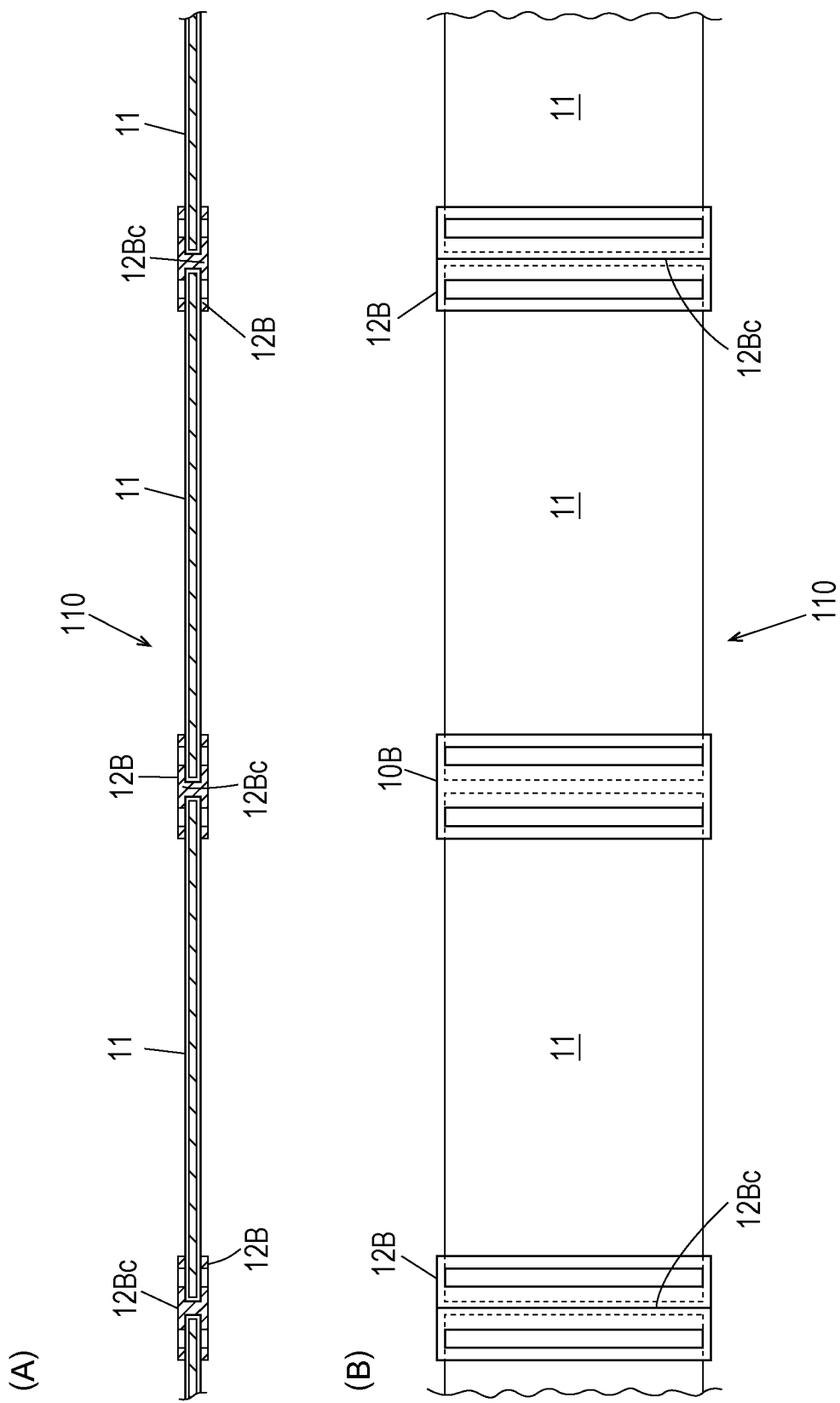
FIG. 6(A) is a side cross-sectional view illustrating a portion of the tape-shaped electrode of FIG. 5.
FIG. 6(B) is a plan view of the tape-shaped electrode of FIG. 6(A).

FIG. 5 is a front view illustrating a tape-shaped electrode of Modification Example 1 in a state of being folded in a zigzag shape according to the invention. In addition, FIG. 6(A) is a side cross-sectional view illustrating a portion of the tape-shaped electrode of FIG. 5, and FIG. 6(B) is a plan view of the tape-shaped electrode of FIG. 6(A).

In a tape-shaped electrode 110 that may be compactly folded in a zigzag shape, notches are formed in middle positions of the respective insulating coupling members 12A in the movement direction in the tape-shaped electrode 10 described with reference to FIGS. 1 to 4. At this point, notches 12Bc are formed alternately on upper and lower surfaces of respective insulating coupling members 12B.

<Modification Example 2 of Embodiment 1-1>

Figure 7:
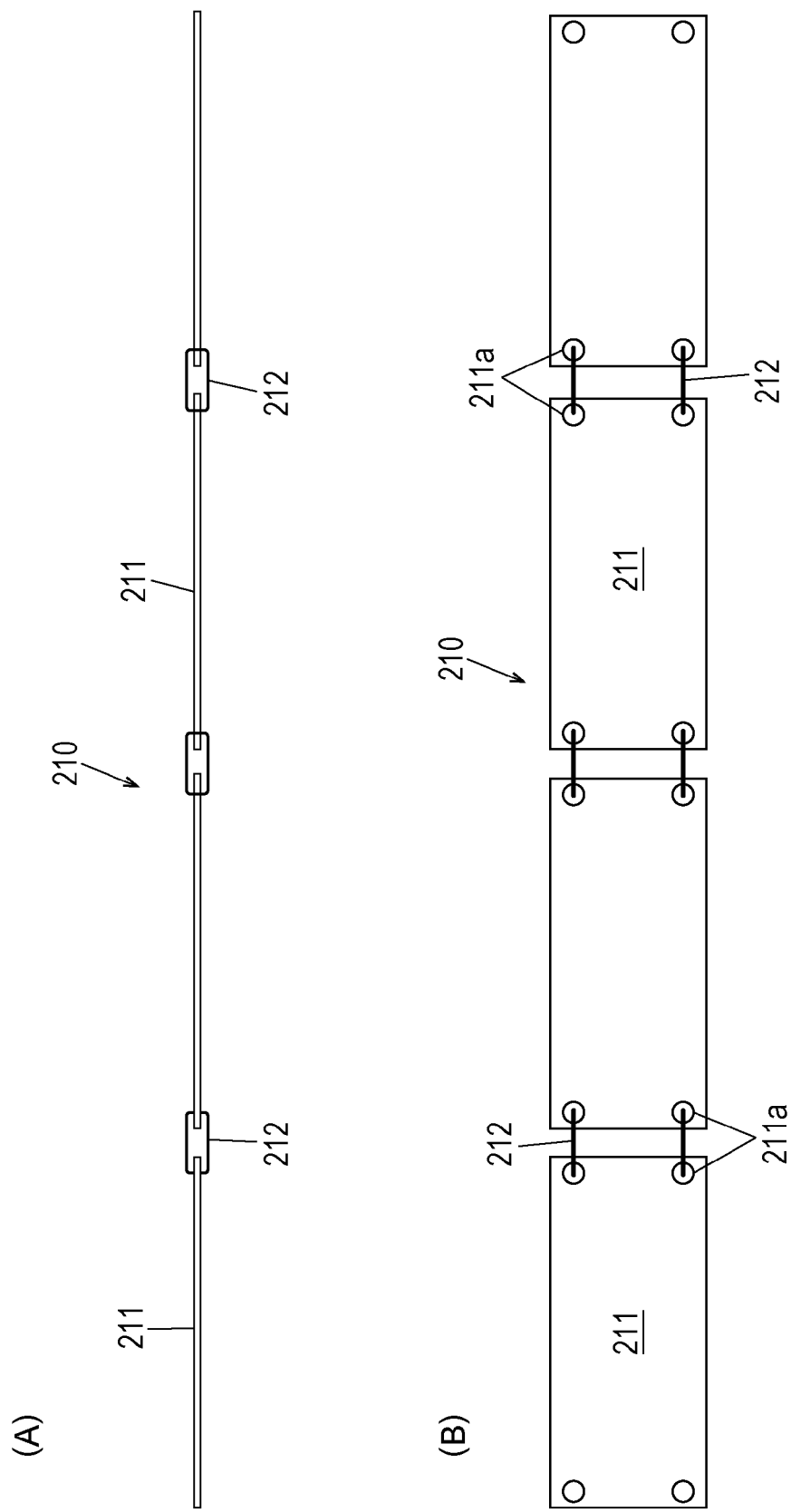
FIG. 7(A) is a side cross-sectional view illustrating a portion of a tape-shaped electrode of Modification Example 2 according to the invention.
FIG. 7(B) is a plan view of a tape-shaped electrode of FIG. 7(A).

FIG. 7(A) is a side cross-sectional view illustrating a portion of a tape-shaped electrode of Modification Example 2 according to the invention, and FIG. 7(B) is a plan view of a tape-shaped electrode of FIG. 7(A).

In the case of the tape-shaped electrode 210, respective conductive plates 211 have through holes 211a formed on facing edge sides thereof. In addition, insulating coupling members 212 are formed with insulating resin strings that couple two adjacent conductive plates 211 by being inserted into the through holes 211a of the facing edge sides and tied in a circular shape. At this point, for example, it is possible to tie the strings in a circular shape by causing both ends of the strings to pass through metal pipes.

<Modification Example 3 of Embodiment 1-1>

Figure 8:
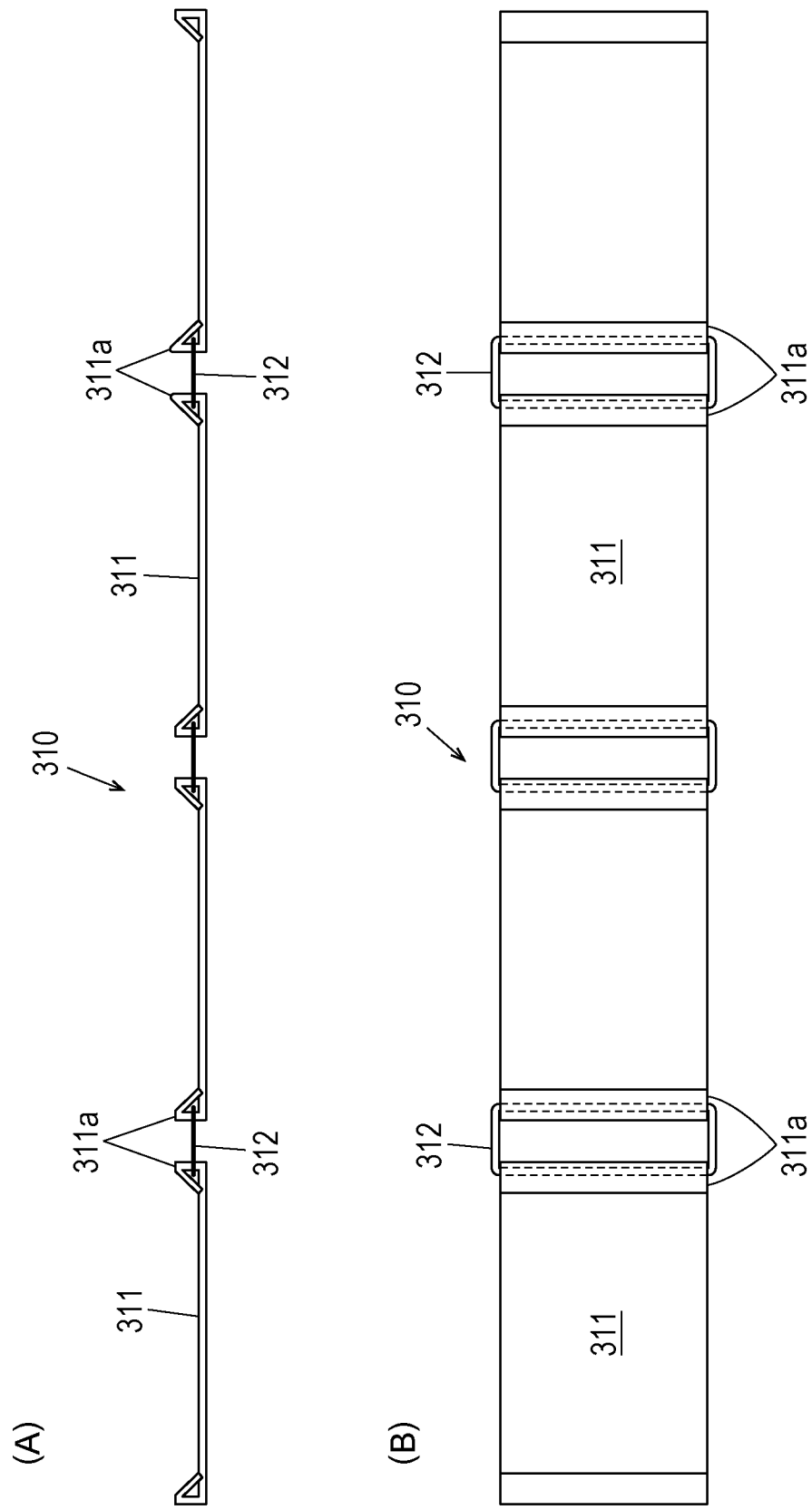
FIG. 8(A) is a side cross-sectional view illustrating a portion of a tape-shaped electrode of Modification Example 3 according to the invention.
FIG. 8(B) is a plan view of the tape-shaped electrode of FIG. 8(A).

FIG. 8(A) is a side cross-sectional view illustrating a portion of a tape-shaped electrode of Modification Example 3 according to the invention, and FIG. 8(B) is a plan view of the tape-shaped electrode of FIG. 8(A).

In the case of the tape-shaped electrode 310, respective conductive plates 311 have folded portions 311a formed by folding facing edge sides thereof in a cylindrical shape. In addition, insulating coupling members 312 are formed of insulating resin strings that couple two adjacent conductive plates 311 by being inserted into the folded portions 311a of the facing edge sides and tied in a circular shape.

<Modification Example 4 of Embodiment 1-1>

Figure 9:
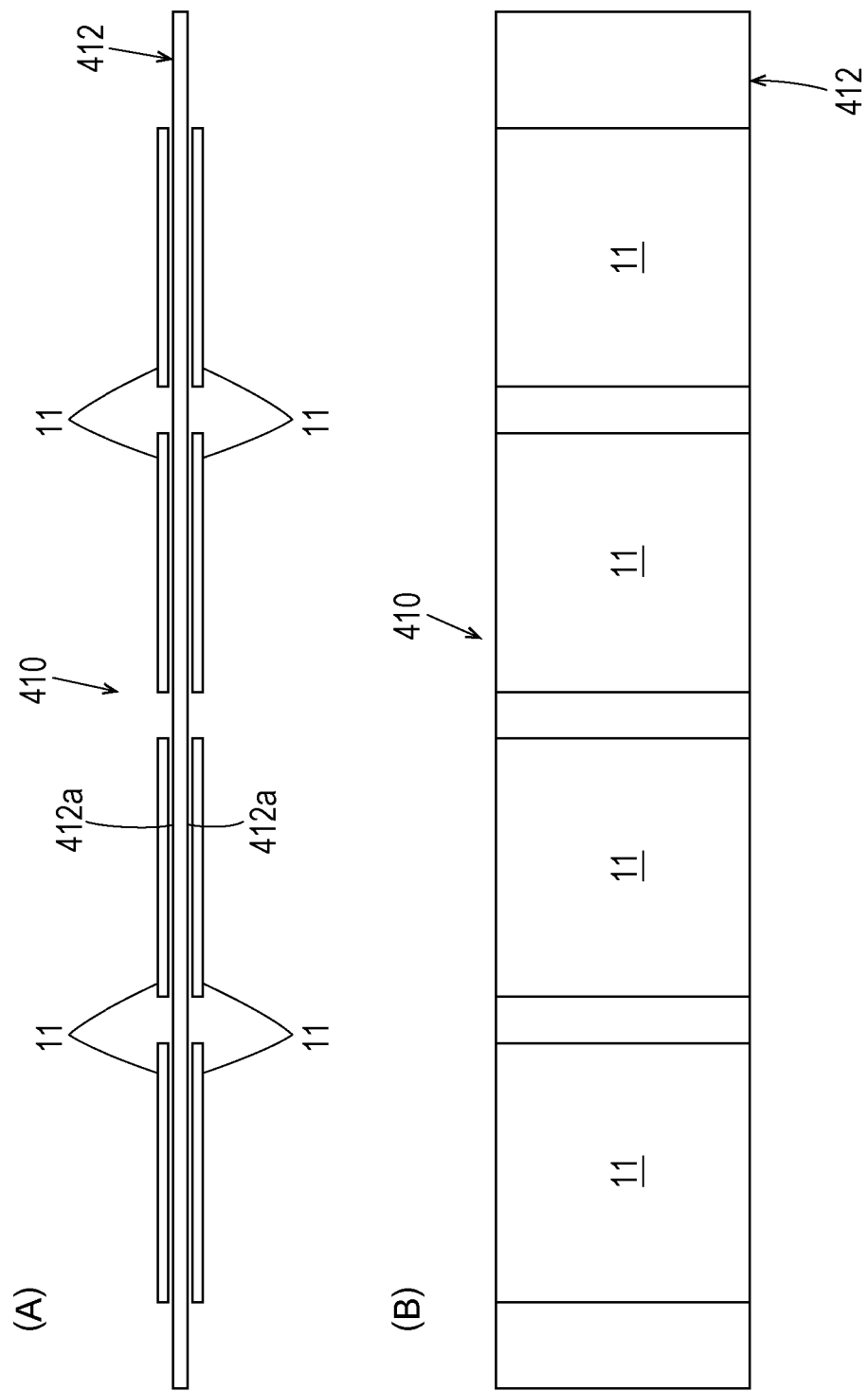
FIG. 9(A) is a side cross-sectional view illustrating a portion of a tape-shaped electrode of Modification Example 4 according to the invention.
FIG. 9(B) is a plan view illustrating the tape-shaped electrode of FIG. 9(A).

FIG. 9(A) is a side cross-sectional view illustrating a portion of a tape-shaped electrode of Modification Example 4 according to the invention, and FIG. 9(B) is a plan view illustrating the tape-shaped electrode of FIG. 9(A).

In the case of a tape-shaped electrode 410, an insulating coupling member 412 is formed of an insulating resin tape having pasting surface portions 412a to which the plurality of conductive plates 11 may be attached in line in one direction. As an insulating resin, it is possible to use the resin material which is the same as the material of the insulating coupling members 12 according to Embodiment 1. The pasting surface portions 412a are formed of an adhesive layer which is provided between both surfaces of the insulating resin tape and the conductive plates 11 and has chemical resistance, and for example, an epoxy resin-based adhesive agent may be used.

(Embodiment 1-2)

Figure 10:
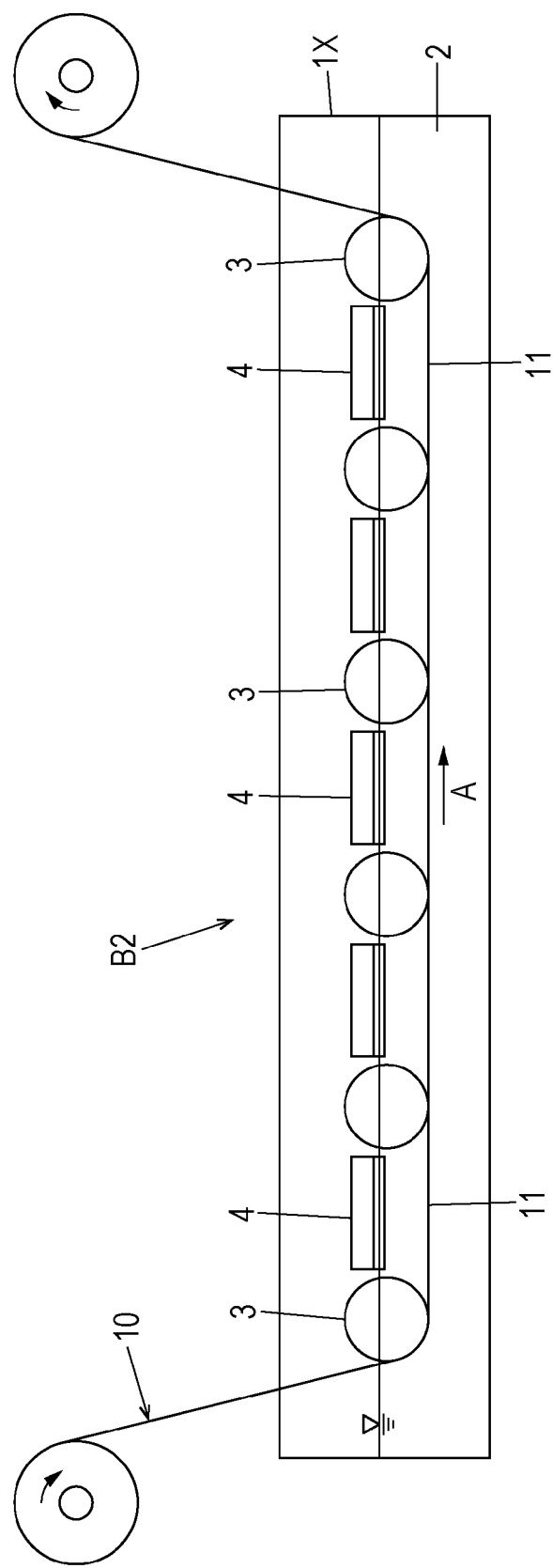
FIG. 10 is a diagram illustrating a configuration of a large metal-air battery obtained by applying Embodiment 1-1 (Embodiment 1-2).

FIG. 10 is a diagram illustrating a configuration of a large metal-air battery obtained by applying Embodiment 1-1 (Embodiment 1-2).

A large metal-air battery B2 includes a large electrolyte solution tank 1X that accommodates the electrolyte solution 2, three or more electrode rollers 3 arranged in one line in the electrolyte solution 2 in the electrolyte solution tank 1X, the tape-shaped electrode 10 that comes into electrical contact with the respective electrode rollers 3 and stretches to the respective electrode rollers 3 in the electrolyte solution 2, and the air electrodes 4 that are provided in all portions between the electrode rollers 3 so as to face the tape-shaped electrode 10. In the case of Embodiment 1-2, six electrode rollers 3 and five air electrode 4 provided between the respective electrode rollers are provided.

An operation of the large metal-air battery B2 at the time of discharge is basically the same as that of Embodiment 1-1. However, in this case, it is desirable to reduce a discharging time in the respective discharge positions so that the electrodeposited layers 11*b* (for example, conductive material of Zn) on one side of each of the conductive plates 11 are consumed, and effective discharge on one sides of the conductive plates 11 is completed at the discharge position on the most downstream side (see FIGS. 2(A) and 2(B)). That is, the discharging time in one discharge position is obtained by dividing the total discharging time of one sheet of conductive plate 11 by the number of discharge positions. In this manner, it is possible to effectively generate large electric power by the large metal-air battery B2.

In this manner, electrodeposited layers formed of the second conductive material in the respective conductive plates are consumed by supplying the electric power to an external circuit from the metal-air batteries using various tape-shaped electrodes described above. Therefore, according to the invention, a reducing device that performs a reducing process so that various used tape-shaped electrodes may be reused is also provided. Hereinafter, various reducing devices are described.

(Embodiment 2-1)

Figure 11:
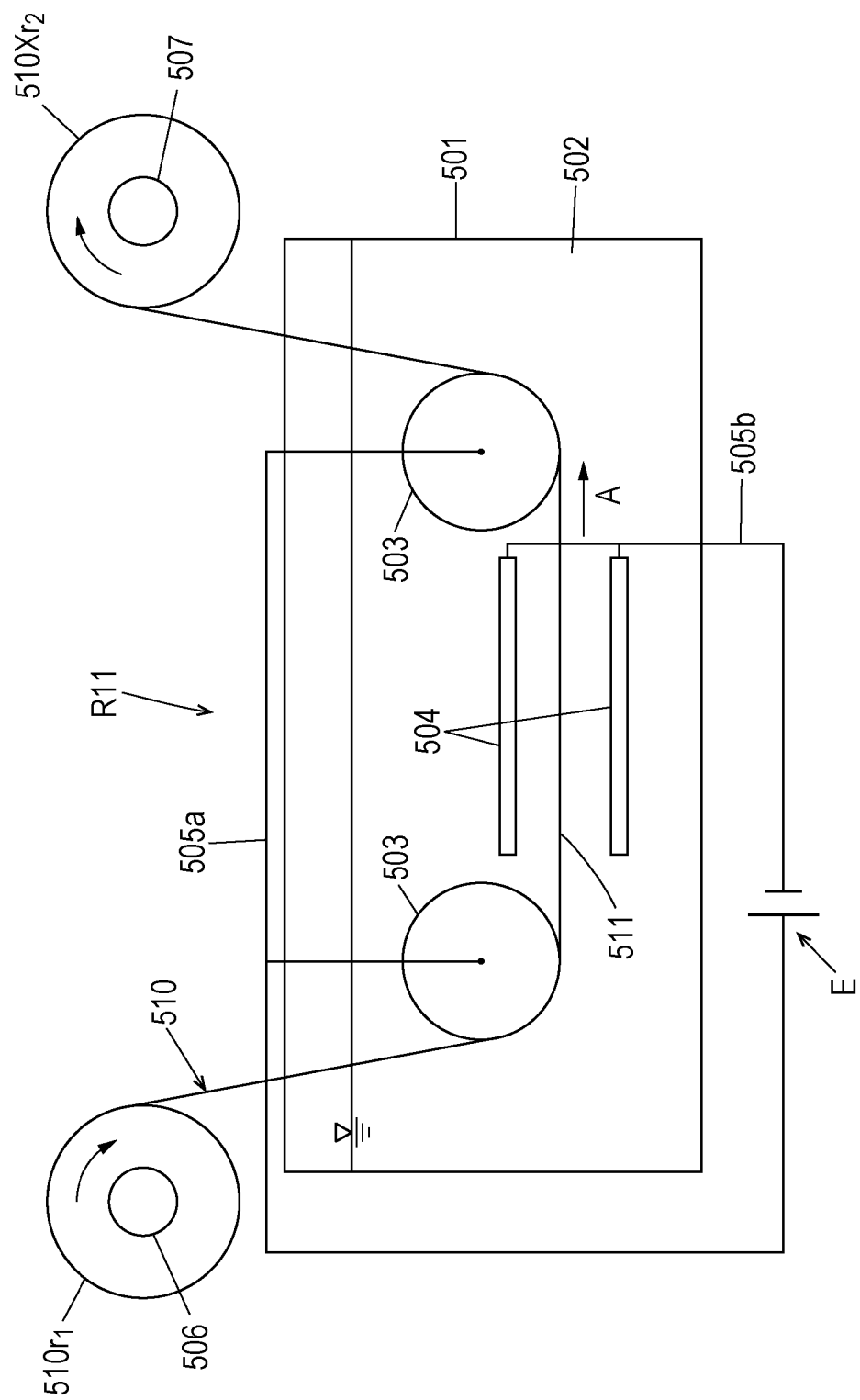
FIG. 11 is a diagram illustrating a configuration of a used tape-shaped electrode reducing device according to the invention (Embodiment 2-1).

FIG. 11 is a diagram illustrating a configuration of a used tape-shaped electrode reducing device according to the invention (Embodiment 2-1).

A reducing device R11 includes an electrolyte solution tank 501 that accommodates the electrolyte solution 2, a pair of electrode rollers 503 provided in an electrolyte solution 502 in the electrolyte solution 501, and opposite electrodes 504 provided in the electrolyte solution 502. Also, various used tape-shaped electrodes 510 employed in the metal-air battery B1 or B2 of Embodiment 1-1 or 1-2 come into electrical contact with the electrode rollers 503, stretch to the plurality of electrode rollers 503 in the electrolyte solution 502, and apply a certain potential from the external power source E to the electrode rollers 503 and the opposite electrodes 504 via conductive portions 505*a* and 505*b* so that the reducing device R11 is configured to reduce conductive plates 511 of the used tape-shaped electrodes 510.

In this case, the opposite electrodes 504 are fixed in a height position in which the opposite electrodes 504 may be arranged in parallel at an even interval in upper or lower positions of the used tape-shaped electrodes 510 that stretch between the pair of electrode rollers 503, for example, to a sidewall of the electrolyte solution tank 1.

Further, the conductive plates 511 of the various used tape-shaped electrodes 510 are obtained by consuming a portion or all of the electrodeposited layers 11*b* formed of the second conductive material of the conductive plates 11 in the tape-shaped electrodes 10, 110, 210, 310, and 410 described with reference to FIGS. 2 to 9 (see FIG. 2), and exposing a portion or all of the substrates 11*a* formed of the first conductive material.

The metal-air battery B1 is different from the reducing device R11 in that the metal-air battery B1 (see FIG. 1) has a configuration in which the discharge reaction occurs between the conductive plates 11 of the tape-shaped electrode 10 and the air electrode 4, while the reducing device R11 has a configuration in which the reducing reaction occurs between the conductive plates of the used tape-shaped electrodes 510 and the opposite electrodes 504. Except for the above configuration, the electrolyte solution tank 501, the electrolyte solution 502, the electrode rollers 503, a holding shaft 506 that rotatably holds a feeding roller 510R11 of the tape-shaped electrode 510, a driving shaft 507 that holds and rotates a winding roller 510Xr$_2$ of the reducing-treated tape-shaped electrode 10, and the like included in the reducing device R11 basically have the same configurations as those included in the metal-air battery B1. However, an oxide of the second conductive material that becomes a material for forming the electrodeposited layer on the surface of the substrate of the used conductive plates 511 is added to the currently-used electrolyte solution 502 in advance, and this is the same in the other reducing device described below. In addition, if oxides collected from the metal-air batteries B1 and B2 are used as the oxide of the second conductive material, it is convenient since the resources may be recycled.

In the case of the reducing device R11, a sheet of used conductive plate 511 is delivered to a portion between the pair of electrode rollers 503 and one electrode roller 503 and the conductive plate 511 are brought into electrical contact with each other so that a certain potential is applied to the electrode roller 503 and the opposite electrodes 504. Accordingly, the reducing reaction which is opposite to the discharge reaction occurs between the conductive plate 511 and the opposite electrodes 504, and the electrodeposited layer formed of the second conductive material on the surface of the substrate of the conductive plate 511 (see FIG. 2). For example, when the electrolyte solution 502 containing ZnO is used, the electrodeposited layer formed of Zn is formed on the surface of the substrate. At this point, since the opposite electrodes 504 are provided on the upper and lower sides of the conductive plate 511, electrodeposited layers are formed on both of the upper and lower surfaces of the conductive plate 511. In addition, if a power generating device using natural energy such as a solar cell or a wind power generator is used as the external power source E, it is preferable since the reducing device R11 and the metal-air batteries B1 and B2 may construct energy circulation systems that may repeatedly generate electric power with only the natural energy without depending on electric power obtained by thermal power generation or nuclear power generation.

Also, if the electrodeposited layer formed on the surface of the substrate has a certain thickness, the used tape electrodes 510 are moved, a subsequent used conductive plate 511 is delivered to a reducing treatment position, the reducing treatment is performed on the used conductive plates 511 one by one in this manner, the reducing treatment is performed on all the conductive plates 511, and thus recycled tape-shaped electrodes which are the same as the tape-shaped electrodes 10, 110, 210, 310, and 410 described with reference to FIGS. 2 to 9 may be obtained.

(Embodiment 2-2)

Figure 12:
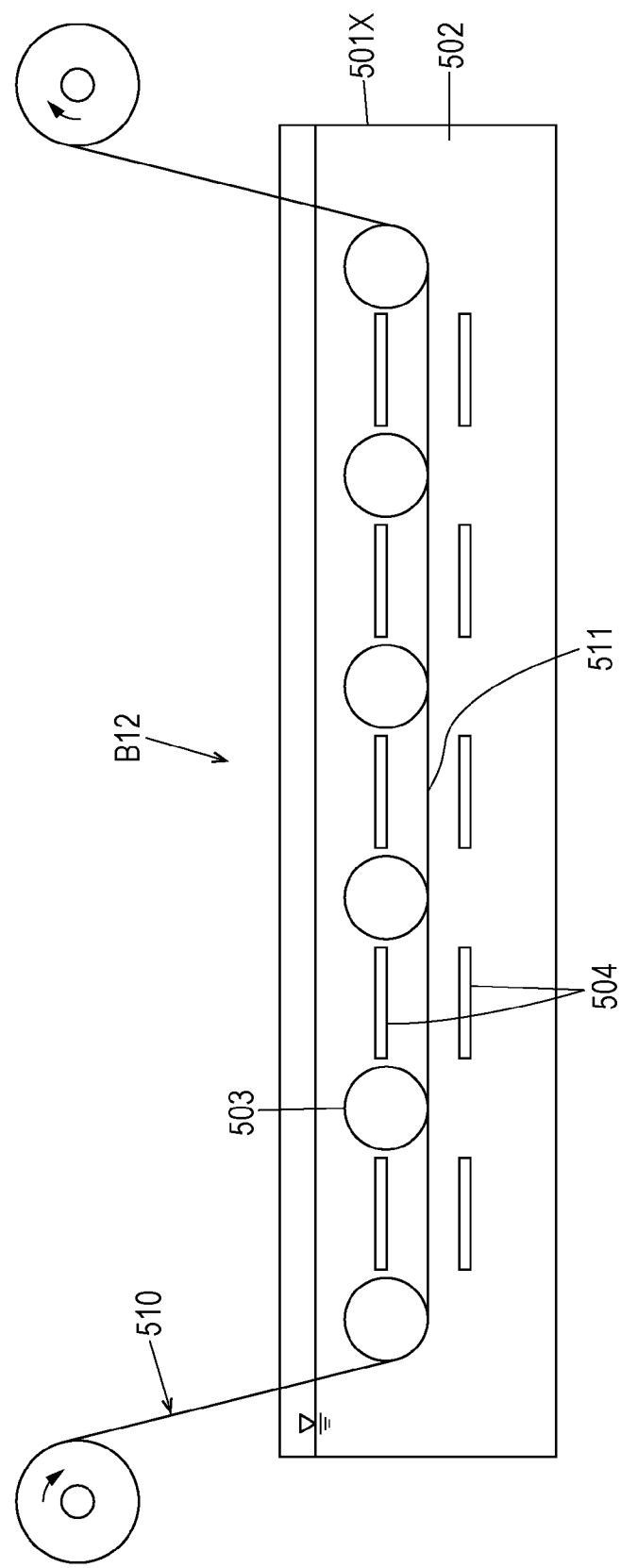
FIG. 12 is a diagram illustrating a configuration of a large reducing device obtained by applying Embodiment 2-1 (Embodiment 2-2).

FIG. 12 is a diagram illustrating a configuration of a large reducing device obtained by applying Embodiment 2-1 (Embodiment 2-2).

A large reducing device R12 includes a large electrolyte solution tank 501X that accommodates the electrolyte solution 502, three or more electrode rollers 503 provided in the electrolyte solution 502 in the electrolyte solution tank 501X, and a plurality of pairs of opposite electrodes 504, the three or more electrode rollers 503 in the electrolyte solution tank 501X are arranged in one line, and a pair of opposite electrodes 504 is provided in every portion between electrode rollers. In the case of Embodiment 2-2, six electrode rollers 503 and five pairs of opposite electrodes 504 are provided.

The operation of the large reducing device R12 at the time of the reducing is basically the same as that in Embodiment 2-2. However, in this case, it is preferable to reduce reducing treatment times in the respective reducing treatment positions so that the formation of electrodeposited layers having a certain thickness on the conductive plates 511 is completed at the reducing treatment position on the most downstream side. That is, a reducing treatment time in one reducing treatment position may be obtained by dividing the total reducing treatment time in one sheet of conductive plate 511 by the number of reducing treatment positions. In this manner, the used tape-shaped electrodes 510 may be effectively recycled by the large reducing device R12.

(Embodiment 3-1)

Figure 13:
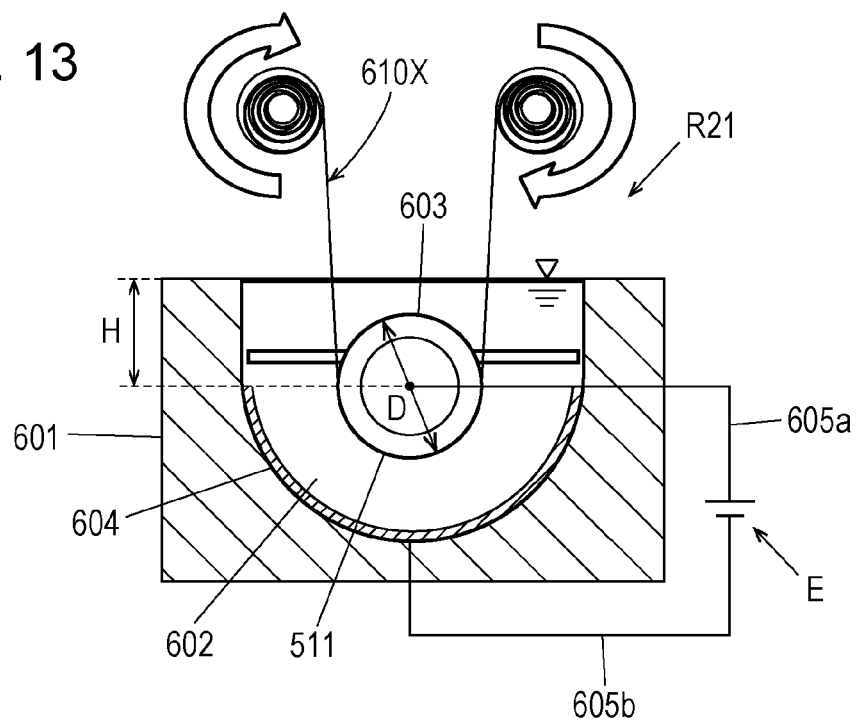
FIG. 13 is a diagram illustrating a configuration of another used tape-shaped electrode reducing device according to the invention (Embodiment 3-1).
Figure 14:
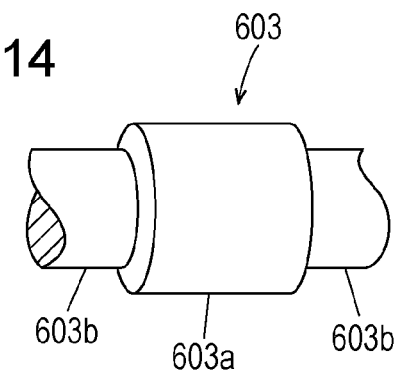
FIG. 14 is a perspective view illustrating an electrode roller in the reducing device of FIG. 13.
Figure 15:
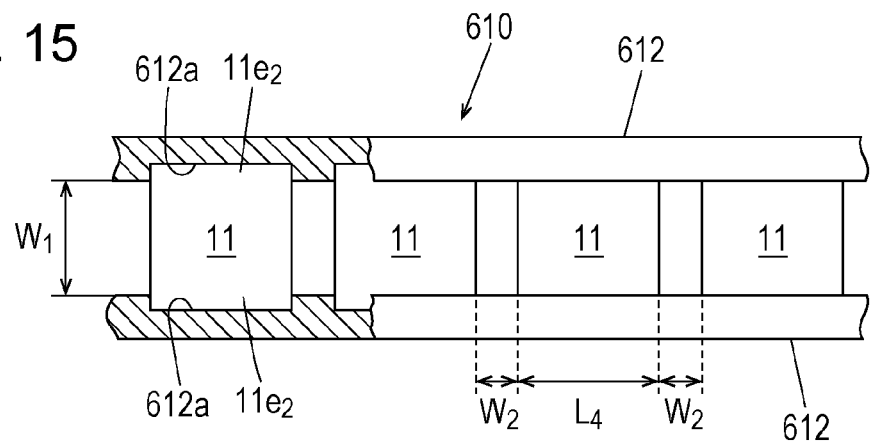
FIG. 15 is a plan view illustrating a portion of the tape-shaped electrode used in the reducing device of FIG. 13.
Figure 16:
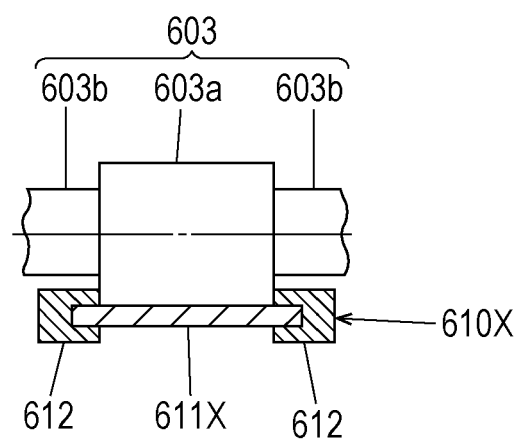
FIG. 16 is a diagram illustrating a contact state of the electrode roller and the tape-shaped electrode in the reducing device of FIG. 13.

FIG. 13 is a diagram illustrating a configuration of another reducing device of the used tape-shaped electrode according to the invention (Embodiment 3-1). In addition, FIG. 14 is a perspective view illustrating the electrode roller in the reducing device of FIG. 13, FIG. 15 is a plan view illustrating a portion of the tape-shaped electrode used in the reducing device of FIG. 13, and FIG. 16 is a diagram illustrating a contact state of the electrode roller and the tape-shaped electrode in the reducing device of FIG. 13.

A reducing device R21 includes an electrolyte solution tank 601 that accommodates an electrolyte solution 602, one electrode roller 603 provided in the electrolyte solution 602 in the electrolyte solution tank 601, and an opposite electrode 604 provided in the electrolyte solution 602. Also, various used tape-shaped electrodes 510 employed in the metal-air battery B1 or B2 of Embodiment 1-1 or 1-2 are brought into electrical contact with a lower portion of an outer peripheral surface of the electrode roller 603, and a certain potential is applied to the electrode roller 603 and the counter electrode 604 by an external power source E via conductive portions 605a and 605b so that the reducing device R21 is configured to reduce conductive plates 611 of the used tape-shaped electrodes 510.

Specifically, the electrolyte solution tank 601 is formed to have a U-shaped cross section viewed from one direction and a bottom surface thereof is curved to a semicircular shape. Also, the arc-shaped opposite electrode 604 is provided along the bottom surface of the electrolyte solution tank 601 which is curved to a semicircular shape.

In addition, the electrode roller 603 is rotatably provided in the electrolyte solution tank 601 so that the rotation axis is positioned in the center of the cross-sectional semicircular shape of the electrolyte solution tank 601. The electrode roller 603 includes a large diameter portion 603a that comes into contact with the conductive plates 511 of the used tape-shaped electrodes 510 and small diameter portions 603b provided on both end surfaces of the large diameter portion 603a. The respective small diameter portions 603b are pivotally provided on both perpendicular sidewalls which face the electrolyte solution tank 601.

In the reducing device R21, the used tape-shaped electrodes 510 obtained after the tape-shaped electrodes 10, 110, 210, 310, and 410 described with reference to FIGS. 2 to 9 are used in discharging may be used, but positions thereof may be deviated in the rotation axis direction of the electrode roller 603. If the positions deviate, a portion of the used conductive plates 511 may not come into contact with the large diameter portion 603a of the electrode roller 603 to decrease the reducing efficiency. Therefore, in the reducing device R21, used tape-shaped electrodes 610X obtained after a tape-shaped electrode 610 illustrated in FIG. 15 is used in discharging are preferably used.

The tape-shaped electrode 610 illustrated in FIG. 15 includes the conductive plates 11 which are the same as those in Embodiment 1-1, and a pair of insulating coupling members 612 that couple a plurality of conductive plates 11. The pair of insulating coupling members 612 is formed of a pair of insulating resin molded articles that couple the plurality of conductive plates 11 by holding the edge sides $11e_2$ extending in one direction of the plurality of conductive plates 11 arranged in one direction. In addition, the insulating coupling members 612 have a plurality of concave portions 612a that are formed on the inner surface thereof at a certain interval to insert the edge sides $11e_2$ of the plurality of conductive plates 11. In the tape-shaped electrode 610, an interval $W_1$ of the pair of insulating coupling members 612 is substantially the same as the length of the large diameter portion 603a of the electrode roller 603.

If the used tape-shaped electrode 610X obtained after the tape-shaped electrode 610 (see FIG. 15) is used in discharging is set to the reducing device R21 as illustrated in FIG. 16, the large diameter portion 603a of the electrode roller 603 is inserted into a groove portion formed by the pair of insulating coupling members 612 and a used conductive plate 611X. Therefore, when the used tape-shaped electrode 610X is moved, the used conductive plate 611X is guided by the groove portion to a position of the large diameter portion 603a of the electrode roller 603 to prevent the position deviation. In addition, the electrode roller 603 and the tape-shaped electrode 610 may be preferably used in the metal-air batteries B1 and B2 of Embodiments 1-1 and 1-2, the reducing device R11, R12, R21, and R22 of Embodiments 2-1, 2-2, 3-1, and 3-2, and reducing devices R31 and R32 described below.

In the reducing device R21, if a diameter of the electrode roller 603 is D, a height from the rotation axis of the electrode roller 603 to a liquid surface of the electrolyte solution 602 is H, a distance from one conductive plate 11 in the tape-shaped electrode 610 to another adjacent conductive plate 11 is $W_2$, and a length of the conductive plate 11 in the movement direction is $L_4$, as long as an expression "$(2H+\frac{1}{2}D\pi) \geq (L_4+2W_2) \geq \frac{1}{2}D\pi$" is satisfied, it is possible to apply a potential only to one section of the conductive plates 11 having the different length $L_4$.

In the case of the reducing device R21, since a reducing treatment is performed on only one surface that faces the opposite electrode 604 in the conductive plate 11, after the reducing treatment on one surface sides of the respective conductive plate 611X in the used tape-shaped electrode 610X is completed, the reducing treatment may be performed on the other surface sides of the conductive plates 611X.

(Embodiment 3-2)

Figure 17:
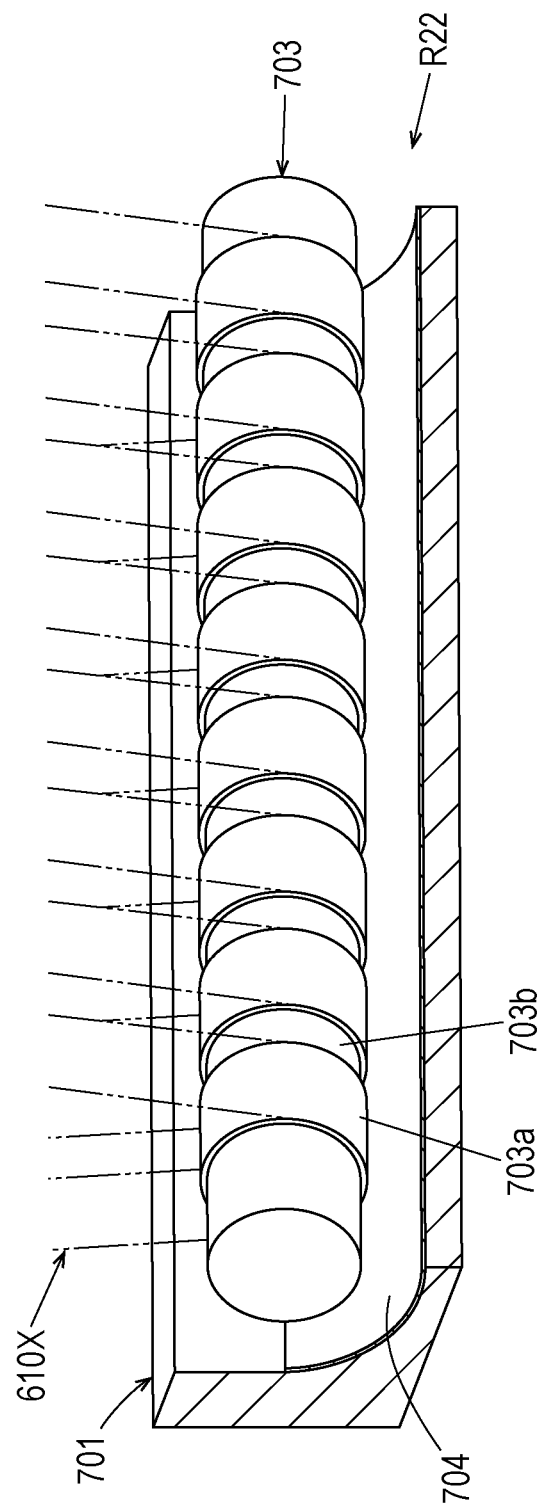
FIG. 17 is a diagram illustrating a configuration of a large reducing device obtained by applying Embodiment 3-1 (Embodiment 3-2).

FIG. 17 is a diagram illustrating a configuration of a large reducing device obtained by applying Embodiment 3-1 (Embodiment 3-2).

A large reducing device R22 has basically the same configuration as the reducing device R21 of Embodiment 2-1 (see FIG. 13), but has differences as follows. That is, the large reducing device R22 in Embodiment 2-2 is different from that in Embodiment 2-1 in that an electrode roller 703 has the plurality of used tape-shaped electrodes 610X that are arranged in the rotation axis direction and have lengths so as to be capable of coming into electrical contact with the lower portion of the outer peripheral surface of the electrode roller 703, and an opposite electrode 704 has a length so as to be capable of facing the plurality of used tape-shaped electrodes 610X that are arranged in the rotation axis direction.

In this case, a plurality of large diameter portions 703a that come into contact with the conductive plate 611X of the used tape-shaped electrode 610X are provided on the electrode roller 703 at an even interval, and small diameter portions 703b are provided portions between the plurality of large diameter portions 703a and both end sides thereof.

The operation of the large reducing device R22 at the time of restoring is basically the same as that in Embodiment 2-1. According to the large reducing device R22, the reducing treatment may be performed simultaneously on the plurality of used tape-shaped electrodes 610X.

(Embodiment 4-1)

Figure 18:
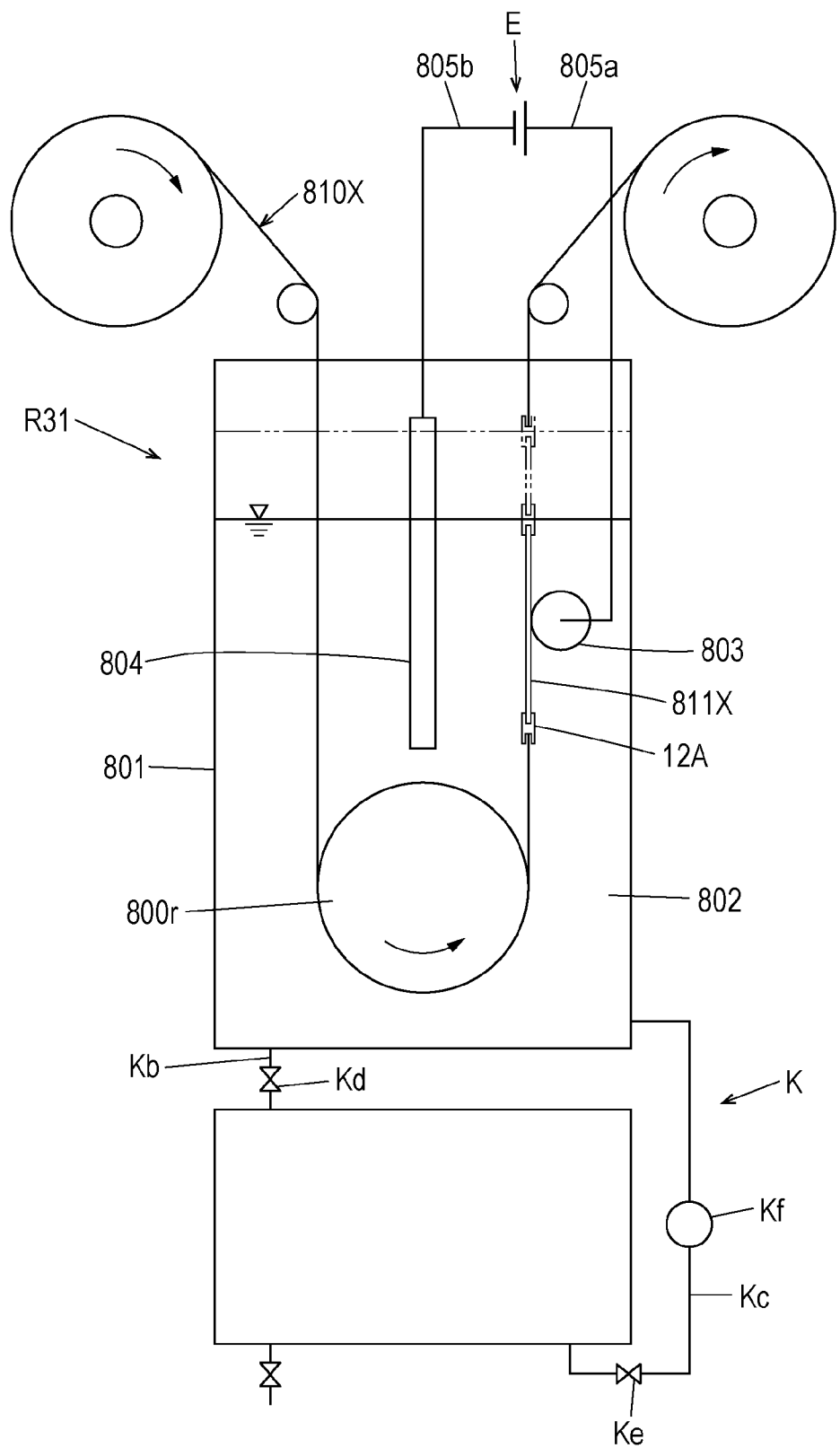
FIG. 18 is a diagram illustrating a configuration of still another used tape-shaped electrode reducing device according to the invention (Embodiment 4-1).

FIG. 18 is a diagram illustrating a configuration of still another reducing device of the used tape-shaped electrode according to the invention (Embodiment 4-1).

The reducing device R31 is a long and narrow electrolyte solution tank 801 that accommodates an electrolyte solution 802, a roller 800r provided in the electrolyte solution 802 in the electrolyte solution tank 801, a roller-shaped contact electrode 803 provided at a position deviated from a portion above the roller 800r in the electrolyte solution 802, and an opposite electrode 804 provided above the roller 800r in the electrolyte solution 802. Also, a used tape-shaped electrode 810X employed in the metal-air battery B1 or B2 of Embodiment 1-1 or 1-2 comes into electrical contact with the contact electrode 803 and is stretched to the roller 800r in the electrolyte solution 802 in a perpendicular manner, and a certain potential is applied from the external power source E to the contact electrode 803 and the opposite electrode 804 via conductive portions 805a and 805b so that the reducing device R31 is configured to reduce a conductive plate 811X of the used tape-shaped electrode 810X.

The reducing device R31 may be further provided with a liquid level height adjusting mechanism K that adjusts the liquid level height of the electrolyte solution 802 in the electrolyte solution tank 801. The liquid level height adjusting mechanism K includes the electrolyte solution tank Ka that accommodates an auxiliary electrolyte solution, first and second pipes Kb and kc that connect the electrolyte solution tank 801 and an electrolyte solution tank Ka, valves Kd and Ke that are provided in the first and second pipes Kb and kc, and a pump Kf that sends an electrolyte solution in the electrolyte solution tank Ka provided in the second pipe Kc to the electrolyte solution tank 801.

According to the reducing device R31, the reducing treatment may be performed on a surface of the opposite electrode 804 which faces the conductive plate 811X by moving the used conductive plate 811X to the reducing treatment position that faces the opposite electrode 804 on the contact electrode 803 side. At this point, the liquid level height of the electrolyte solution 802 may be matched to the upper end position of the conductive plate 811X by the liquid level height adjusting mechanism K. Also, the liquid level height of the electrolyte solution 802 may be adjusted for the conductive plate 811X having a different length in the movement direction.

(Embodiment 4-2)

Figure 19:
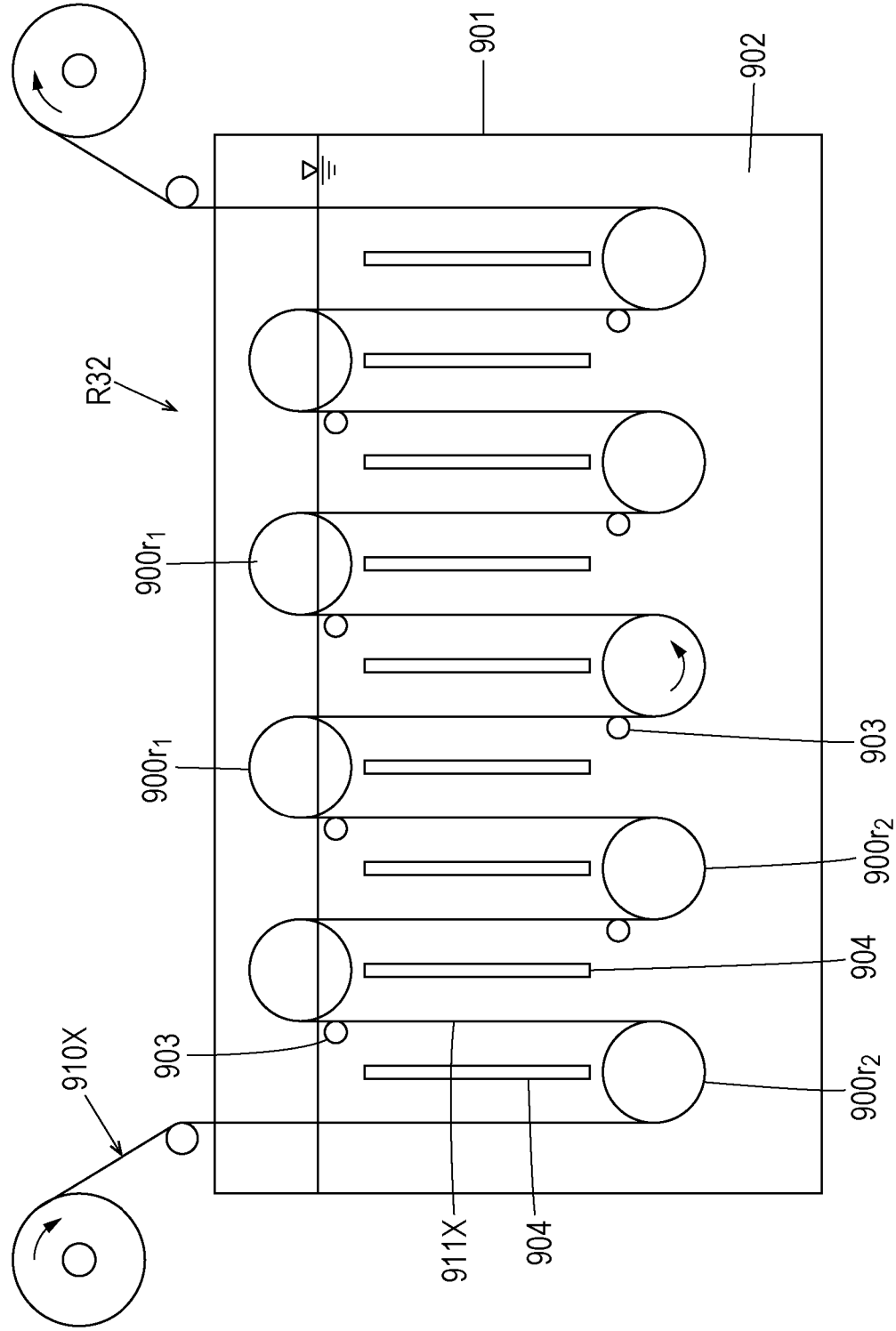
FIG. 19 is a diagram illustrating a large reducing device obtained by applying Embodiment 4-1 (Embodiment 4-2).

FIG. 19 is a diagram illustrating a configuration of a large reducing device obtained by applying Embodiment 4-1 (Embodiment 4-2).

The large reducing device R32 includes an electrolyte solution tank 901 that accommodates an electrolyte solution 902, three or greater odd numbers of rollers $900r_1$ and $900r_2$ which are provided in a zigzag arrangement in two upper and lower steps in the electrolyte solution 902 in the electrolyte solution tank 901, the plurality of opposite electrodes 904 provided on the upper portion of the upper roller $900r_1$ and the lower portion of the lower roller $900r_2$, and a plurality of contact electrodes 903 provided in all portions between the opposite electrodes or near the portions. Also, a used tape-shaped electrode 910X employed in the metal-air battery B1 or B2 of Embodiment 1-1 or 1-2 comes into electrical contact with the plurality of contact electrodes 903 and stretches to the plurality of rollers $900r_1$ and $900r_2$ in the electrolyte solution 902 in a meandering shape, and a certain potential is applied to the respective contact electrodes 903 and the respective opposite electrodes 904 so that the reducing device R32 is configured to simultaneously reduce respective conductive plates 911X of the used tape-shaped electrode 910X.

According to the large reducing device R32, since a portion between two opposite electrodes 904 is the reducing treatment position, front and rear surfaces of the conductive plates 911X are simultaneously subjected to the reducing treatment to form the electrodeposited layer. In this case, it is desirable that the reducing treatment times in the respective reducing treatment positions be reduced so that the formation of the electrodeposited layer having a certain thickness on the conductive plates 911X is completed in the reducing treatment position on the most downstream side. That is, a reducing treatment time in one reducing treatment position may be obtained by dividing the total reducing treatment time in one sheet of conductive plates 911X by the number of reducing treatment positions. In this manner, the used tape-shaped electrodes 510 maybe effectively recycled by the large reducing device R32.

(Other embodiments)

The roller 800r of the reducing device R31 of Embodiment 4-1 (FIG. 18) may be formed to be long so that a plurality of used tape-shaped electrodes may be set in the same manner as in Embodiment 3-2 (FIG. 17), and the used tape-shaped electrodes may be subjected to the reducing treatment. In this case, the contact electrodes 803 and the opposite electrodes 804 are further provided according to the number of set used tape-shaped electrodes.

REFERENCE SIGNS LIST 1, 501, 501X, 601, 701, 801, 901 ELECTROLYTE SOLUTION TANK
2, 502, 602, 802, 902 ELECTROLYTE SOLUTION
3, 3A and 3B, 503, 603, 703 ELECTRODE ROLLER
3E, 803, 903 CONTACT ELECTRODE
4 AIR ELECTRODE
10, 110, 210, 310, 410, 610 TAPE-SHAPED ELECTRODE
11, 211, 311 CONDUCTIVE PLATE

11a SUBSTRATE
11b ELECTRODEPOSITED LAYER
11e$_2$, 11e$_2$ EDGE SIDE
12A, 12B, 212, 312, 412, 612 INSULATING COUPLING MEMBER
211a THROUGH HOLE
311a FOLDED PORTION
412a PASTING SURFACE PORTION
504, 604, 704, 804, 904 OPPOSITE ELECTRODE
510, 610X, 810X, 910X USED TAPE-SHAPED ELECTRODE
511, 611X, 811X, 911X USED CONDUCTIVE PLATE

The invention claimed is:

1. A metal-air battery comprising:
an electrolyte solution tank that accommodates an electrolyte solution;
a plurality of electrode rollers that are provided in the electrolyte solution in the electrolyte solution tank;
the tape-shaped electrode which comes into electrical contact with the plurality of electrode rollers and is stretched by the plurality of electrode rollers in the electrolyte solution; and
an air electrode that is provided in the electrolyte solution tank to face the tape-shaped electrode between the plurality of electrode rollers.

2. The metal-air battery according to claim 1,
wherein three or more electrode rollers are provided in the electrolyte solution tank in one line, and
wherein the air electrodes are provided in all portions between the electrode rollers.

\* \* \* \* \*